(12) United States Patent
Maeda et al.

(10) Patent No.: US 9,061,856 B2
(45) Date of Patent: Jun. 23, 2015

(54) METHOD FOR CONTROLLING SHEET PROCESSING APPARATUS

(75) Inventors: Takaaki Maeda, Kinokawa (JP); Akihiko Toki, Kinokawa (JP); Satoshi Ota, Kinokawa (JP); Shuhei Kosaka, Kinokawa (JP); Masasuke Funase, Kinokawa (JP)

(73) Assignee: DUPLO SEIKO CORPORATION, Kinokawa-Shi, Wakayama (JP)

( * ) Notice: Subject to any disclaimer, the term of this patent is extended or adjusted under 35 U.S.C. 154(b) by 140 days.

(21) Appl. No.: 14/005,901

(22) PCT Filed: Feb. 15, 2012

(86) PCT No.: PCT/JP2012/053461
§ 371 (c)(1),
(2), (4) Date: Sep. 18, 2013

(87) PCT Pub. No.: WO2012/127940
PCT Pub. Date: Sep. 27, 2012

(65) Prior Publication Data
US 2014/0011654 A1    Jan. 9, 2014

(30) Foreign Application Priority Data

Mar. 24, 2011 (JP) ................... 2011-066294
Oct. 7, 2011 (JP) ................... 2011-222717

(51) Int. Cl.
*B23Q 15/00* (2006.01)
*B65H 35/04* (2006.01)
(Continued)

(52) U.S. Cl.
CPC ............ *B65H 35/0006* (2013.01); *B23Q 15/00* (2013.01); *B26D 1/085* (2013.01); *B26D 5/20* (2013.01); *B26D 2001/0066* (2013.01)

(58) Field of Classification Search
CPC ............... B65H 35/0006; B65H 35/06; B65H 35/0073; B65H 35/04; B23Q 15/00; B23Q 15/007; B23Q 15/013; B23Q 15/02; B23Q 15/04; B23Q 15/08; B26D 5/005; B26D 5/20; B26D 5/26; B26D 2005/002; B26D 7/18; B26D 1/08; B26D 2001/0066
USPC ................. 493/369, 340, 342, 363, 364, 373; 83/72, 73, 74, 75, 75.5, 76, 102, 104, 83/105, 109, 636, 582, 583, 584, 585, 401, 83/408, 407, 697, 694
See application file for complete search history.

(56) References Cited

U.S. PATENT DOCUMENTS 4,611,518 A * 9/1986 Hildebrandt ................... 83/105
2006/0145415 A1* 7/2006 Oota et al. ..................... 271/264
(Continued)

FOREIGN PATENT DOCUMENTS

JP   2001-232700 A   8/2001
JP   2010-240820 A   10/2010
JP   2010-274353 A   12/2010

OTHER PUBLICATIONS

International Search Report (PCT/ISA/210) mailed on Mar. 19, 2012, by the Japanese Patent Office as the International Searching Authority for International Application No. PCT/JP2012/053461.
(Continued)

*Primary Examiner* — Phong Nguyen
(74) *Attorney, Agent, or Firm* — Buchanan Ingersoll & Rooney PC

(57) ABSTRACT

In the control of a cutting mechanism of a sheet processing apparatus, when rear end cut region of a sheet is finely cut and divided into predetermined fine-cutting unit length, if sheet conveying direction length of rearmost end divided region is equal to or more than minimum reference length corresponding to the distance between cutting position of the cutting mechanism and nipping position of a pair of first conveying rollers and is less than maximum reference length in which predetermined fine-cutting unit length is added to minimum reference length, upper and lower blades of the cutting mechanism are held opened immediately after the downstream edge of rearmost end divided region is cut and the pair of first conveying rollers are driven at limited conveying speed lower than normal conveying speed.

8 Claims, 27 Drawing Sheets

(51) Int. Cl.
  *B65H 35/00* (2006.01)
  *B26D 1/08* (2006.01)
  *B26D 5/20* (2006.01)
  *B26D 1/00* (2006.01)

(56) References Cited

U.S. PATENT DOCUMENTS

2011/0056799 A1* 3/2011 Eoka .......................... 198/464.2
2011/0169217 A1* 7/2011 Ziegler et al. ................. 271/278
2011/0277613 A1* 11/2011 Rimai et al. .................... 83/865

OTHER PUBLICATIONS

Written Opinion (PCT/ISA/237) mailed on Mar. 19, 2012, by the Japanese Patent Office as the International Searching Authority for International Application No. PCT/JP2012/053461.

* cited by examiner

METHOD FOR CONTROLLING SHEET PROCESSING APPARATUS

TECHNICAL FIELD

The present invention relates to a method for controlling a sheet processing apparatus. More specifically, the present invention relates to a method for controlling a sheet processing apparatus having a cutting mechanism which cuts a sheet in a direction orthogonal to a sheet conveying direction.

BACKGROUND ART

A sheet processing apparatus has been developed which combines, as needed, a cutting mechanism, a slit forming mechanism which cuts a sheet in parallel with a sheet conveying direction, and a fold forming mechanism which forms a fold onto the sheet, by cassetting.

FIG. 27 shows a cutting mechanism of a sheet processing apparatus. A cutting mechanism 201 includes an upper movable blade 201a, and a lower fixed blade 201b. The upper movable blade 201a is driven to be raised and lowered to cut sheet N at cutting position P1 in a direction orthogonal to sheet conveying direction F. A pair of conveying rollers 202 including an upper conveying roller 202a and a lower conveying roller 202b are arranged on the sheet conveying upstream side of the cutting mechanism 201. A pair of conveying rollers 203 including an upper conveying roller 203a and a lower conveying roller 203b are arranged on the sheet conveying downstream side of the cutting mechanism 201. In addition, a sheet receiving section 204 is arranged on the sheet conveying downstream side of the pair of conveying rollers 203 on the sheet conveying downstream side.

FIG. 14 shows an example of the array pattern of products Q processed from one sheet N by the sheet processing apparatus. In this array pattern, four products Q having folds are manufactured by a cutting process and a fold forming process. Specifically, the slit forming mechanism cuts sheet N on a plurality of slitting lines E in parallel with sheet conveying direction F to cut away cut regions K at both ends and in the middle in sheet conveying width direction W, the fold forming mechanism forms folds along folding lines G in sheet conveying width direction W orthogonal to sheet conveying direction F, and the cutting mechanism 201 (FIG. 27) cuts sheet N on a plurality of cutting lines C and Cr in sheet conveying width direction W to cut front end cut region (front end margin) Sf, middle cut region Sm, and rear end cut region (rear end margin) Sr.

In processing sheet N in the array pattern in FIG. 14, in the cutting process as shown in FIG. 27, the cut strips in front end cut region Sf and middle cut region Sm after cutting pass through between the cutting mechanism 201 and the pair of conveying rollers 203 on the sheet conveying downstream side to be discharged downward. On the other hand, the cut strip in rear end cut region Sr passes through between the cutting mechanism 201 and the pair of conveying rollers 202 on the sheet conveying upstream side to be discharged downward.

Sheet conveying direction length Lr of rear end cut region Sr is different according to the size, number, and array of products Q. When sheet conveying direction length Lr of rear end cut region Sr is too long, the cut strip in rear end cut region Sr after cutting cannot be discharged downward. For instance, as shown in FIG. 28, when sheet conveying direction length Lr of rear end cut region Sr is longer than distance D1 between cutting position P1 of the cutting mechanism 201 and nipping position P2 of the pair of conveying rollers 202 on the sheet conveying upstream side, the cut strip in rear end cut region Sr after cutting is vigorously fed out in conveying direction F by the pair of conveying rollers 202 on the conveying upstream side rotated at normal conveying speed V1. With this, the cut strip in rear end cut region Sr passes over the lower fixed blade 201b to be stayed on the sheet conveying downstream side of the cutting mechanism 201, is nipped between the pair of conveying rollers 203 on the sheet conveying downstream side to be discharged into the sheet receiving section 204, and is stayed on the lower fixed blade 201b. These phenomena cause sheet jamming and cutting failure.

To eliminate these, as shown in FIG. 29, the present applicants have contemplated a controlling method in which when sheet conveying direction length Lr of rear end cut region Sr is equal to or more than a predetermined value, rear end cut region Sr is finely cut and divided into predetermined fine-cutting unit length Lr0 from the sheet conveying downstream end thereof (Patent Document 1). Predetermined fine-cutting unit length Lr0 is set to be the length to the extent that the cut strip in finely-cut divided region Sr0 can be discharged downward from a gap between the cutting mechanism 201 and the pair of conveying rollers 203 on the sheet conveying downstream side in FIG. 27.

PRIOR ART DOCUMENTS

Patent Documents

Patent Document 1: Japanese Patent Laid-open Publication No. 2001-232700, paragraph "0061", FIG. 8

SUMMARY OF THE INVENTION

Problems to be Solved by the Invention

FIGS. 30 to 35 show a cutting process for cutting and dividing rear end cut region Sr, as shown in FIG. 29, in order. In the early-stage conveying and cutting processes shown in FIGS. 30 and 31, the rear end of rear end cut region Sr which is nipped between the pair of conveying rollers 202 on the sheet conveying upstream side is cut, and the cut strip in divided region Sr0 which has been cut into predetermined fine-cutting unit length Lr0 is then discharged downward from between the cutting mechanism 201 and the pair of conveying rollers 203 on the sheet conveying downstream side.

The cutting and dividing operation of rear end cut region Sr is advanced to shorten the remaining portion in rear end cut region Sr. As shown in FIG. 32, rear edge Nb of rear end cut region Sr passes through nipping position P2 of the pair of conveying rollers 202 on the sheet conveying upstream side. As shown in FIG. 33, rear edge Nb of the remaining portion in rear end cut region Sr is lifted by the reaction of the cutting operation. As shown in FIG. 34, the remaining portion in rear end cut region Sr is retained by the lower fixed blade 201b and the lower conveying roller 202b on the sheet conveying upstream side to be stayed without being dropped. As shown in FIG. 35, when the pair of conveying rollers 202 on the sheet conveying upstream side are rotated at normal conveying speed V1, the front end of succeeding sheet N and the rear end of the remaining portion in rear end cut region Sr next to succeeding sheet N are overlapped with each other. Consequently, the remaining portion in rear end cut region Sr is conveyed together with succeeding sheet N. With this, sheet jamming, sheet damaging, and discharging of the remaining portion in rear end cut region Sr into the sheet receiving section 204 can be caused.

In addition, when the conveying direction length of the product (a result) is shortened, the pitch in the front-rear direction between the pair of conveying rollers 202 on the upstream side and the pair of conveying rollers 203 on the downstream side is narrowed. However, as the pitch between the conveying rollers is narrower, predetermined fine-cutting unit length Lr0 is required to be shorter. As a result, the sheet conveying distance for one fine-cutting and dividing operation becomes shorter, so that the rotational angle of the pair of conveying rollers 202 on the upstream side corresponding to the sheet conveying distance becomes smaller. When the rotational angle of the pair of conveying rollers 202 on the upstream side corresponding to the conveying distance of the cut strip becomes smaller, the cut strip in the last divided region being conveyed is not discharged and is left in the upper half region of the lower conveying roller 202b of the pair of conveying rollers 202 on the upstream side.

An object of the present invention is to provide a method for controlling a sheet processing apparatus having a process for finely cutting, dividing, and discharging the rear end cut region of a sheet, in which a cut strip to be cut by a cutting mechanism and discharged downward can be immediately discharged downward without being stayed near the cutting mechanism.

Solutions to the Problems

In order to solve the problems, a first invention of the present invention provides a method for controlling a sheet processing apparatus including a cutting mechanism which cuts a sheet in a direction orthogonal to a sheet conveying direction by a lower fixed blade and an upper movable blade, a pair of first conveying rollers which are arranged on the sheet conveying upstream side of the cutting mechanism and feed the sheet to the cutting mechanism, a pair of second conveying rollers which are arranged on the sheet conveying downstream side of the cutting mechanism, driving sources which independently drive the pair of first conveying rollers, the pair of second conveying rollers, and the cutting mechanism, and a control section which controls the operation of the driving sources, in which when sheet conveying direction length (Lr) of rear end cut region (Sr) of the sheet is equal to or more than predetermined value (Dn), rear end cut region (Sr) is sequentially cut and divided into predetermined fine-cutting unit length (Lr0) from the sheet conveying downstream end thereof, wherein when sheet conveying direction length (Lr1) of rearmost end divided region (Sr1) in rear end cut region (Sr) is equal to or more than minimum reference length (D1) corresponding to the distance between cutting position (P1) of the cutting mechanism and nipping position (P2) of the pair of first conveying rollers and is less than maximum reference length (D2) in which predetermined fine-cutting unit length (Lr0) is added to minimum reference length (D1), the control section controls the driving sources to hold the upper and lower blades of the cutting mechanism opened immediately after the downstream edge of rearmost end divided region (Sr1) is cut and to drive the pair of first conveying rollers at a limited conveying speed lower than a normal conveying speed.

The first invention preferably includes the following configuration.
(a) The lower conveying roller of the pair of first conveying rollers is driven by the driving mechanism.
(b) Predetermined fine-cutting unit length (Lr0) is set to be equal to or less than interval (D3) in the sheet conveying direction between the cutting mechanism and the pair of second conveying rollers.
(c) The normal conveying speed is equal to or more than approximately 600 mm/sec, and the limited conveying speed is equal to or less than approximately 500 mm/sec.

A second invention of the present invention provides a method for controlling a sheet processing apparatus including a cutting mechanism which cuts a sheet in a direction orthogonal to a sheet conveying direction by a pair of cutting blades on the opposite sides of a sheet conveying surface, a pair of first conveying rollers which are arranged on the sheet conveying upstream side of the cutting mechanism, a pair of second conveying rollers which are arranged on the sheet conveying downstream side of the cutting mechanism, driving sources which drive the pair of first conveying rollers, the pair of second conveying rollers, and the cutting mechanism, and a control section which controls the operation of the driving sources, in which when sheet conveying direction length (Lr) of rear end rear end cut region (Sr) of the sheet is equal to or more than predetermined value (Dn), rear end cut region (Sr) is sequentially cut and divided into predetermined fine-cutting unit length (Lr0) from the sheet conveying downstream end thereof, wherein the control section controls the driving sources so that sheet conveying direction length (Lr1) of rearmost end divided region (Sr1) in rear end cut region (Sr) is the length substantially corresponding to the distance between cutting position (P1) of the cutting mechanism and nipping position (P2) of the pair of first conveying rollers and that when rearmost end divided region (Sr1) passes through the nipping position of the pair of first conveying rollers, the pair of first conveying rollers are rotated 90° or more.

The second invention preferably includes the following configuration.
(d) After the pair of first conveying rollers are rotated 90° or more, the cutting mechanism is controlled to perform a re-cutting operation with respect to rearmost end divided region (Sr1). In this case, more preferably, the pair of first conveying rollers are stopped at the time of the re-cutting operation of the cutting mechanism. In addition, the pair of first conveying rollers are controlled to restart rotation after the re-cutting operation of the cutting mechanism.

Effects of the Invention

The first invention of the present invention is as follows:
(1) When sheet conveying direction length (Lr) of rear end cut region (Sr) of the sheet is long, the sheet is finely cut and divided into predetermined fine-cutting unit length (Lr0) sequentially from the sheet conveying downstream end of rear end cut region (Sr) to be discharged. Therefore, not only the cut strip cut into predetermined fine-cutting unit length (Lr0), but also the cut strip in rearmost end divided region (Sr1) which is left last, can be immediately discharged downward from between the cutting mechanism and the pair of first conveying rollers on the sheet conveying upstream side without being stayed. With this, sheet jamming, sheet damaging, and discharging of the cut strip into the sheet receiving section together with the product can be eliminated.
(2) To improve the operation efficiency of the sheet processing apparatus, it is necessary to increase the normal conveying speed of the sheet. However, even when the normal conveying speed is increased, the conveying speed of the pair of first conveying rollers on the sheet conveying upstream side is only temporarily lowered to solve the problems. Therefore, the problems can be solved while the operation efficiency can be improved.
(3) While the cutting mechanism is held opened, the pair of first conveying rollers on the sheet conveying upstream side are only controlled at the speed lower than the normal conveying speed. Therefore, it is unnecessary to add any special mechanisms, so that the cost can be lowered.

(4) According to configuration (a), the lower conveying roller of the pair of first conveying rollers on the sheet conveying upstream side is a driving roller. Therefore, the lower conveying roller on the driving side can reliably guide the sheet conveying upstream edge of the cut strip in rearmost end divided region (Sr1) downward.

(5) According to configuration (b) the cut strip cut into predetermined fine-cutting length (Lr0) can be reliably discharged downward from between the cutting mechanism and the pair of second conveying rollers.

(6) According to configuration (c), the normal conveying speed is set to be approximately 600 mm/sec or more, and the limited conveying speed is set to be approximately 500 mm/sec or less. Therefore, the operation efficiency can be improved to the extent possible while the problems can be solved.

The second invention of the present invention is as follows:

(1) When sheet conveying direction length (Lr) of rear end cut region (Sr) of the sheet is long, the sheet is finely cut and divided into predetermined fine-cutting unit length (Lr0) sequentially from the sheet conveying downstream end of rear end cut region (Sr) to be discharged. Therefore, not only the cut strip cut into predetermined fine-cutting unit length (Lr0), but also the cut strip in rearmost end divided region (Sr1) which is left last, can be reliably and immediately discharged downward from between the cutting mechanism and the pair of first conveying rollers on the sheet conveying upstream side without being stayed. With this, sheet jamming, sheet damaging, and discharging of the cut strip into the sheet receiving section together with the product can be eliminated.

(2) In addition, the pair of first conveying rollers are rotated 90° or more after rearmost end divided region (Sr1) is cut to perform the re-cutting operation. An impact is given onto the cut strip in the rearmost end divided region to reliably drop the cut strip in the rearmost end divided region. At this time, the pair of first conveying rollers are stopped to give an impact onto the cut strip more reliably.

EMBODIMENTS OF THE INVENTION

The Embodiment of a First Invention

"The Overall Configuration of a Sheet Processing Apparatus"

Figure 1:
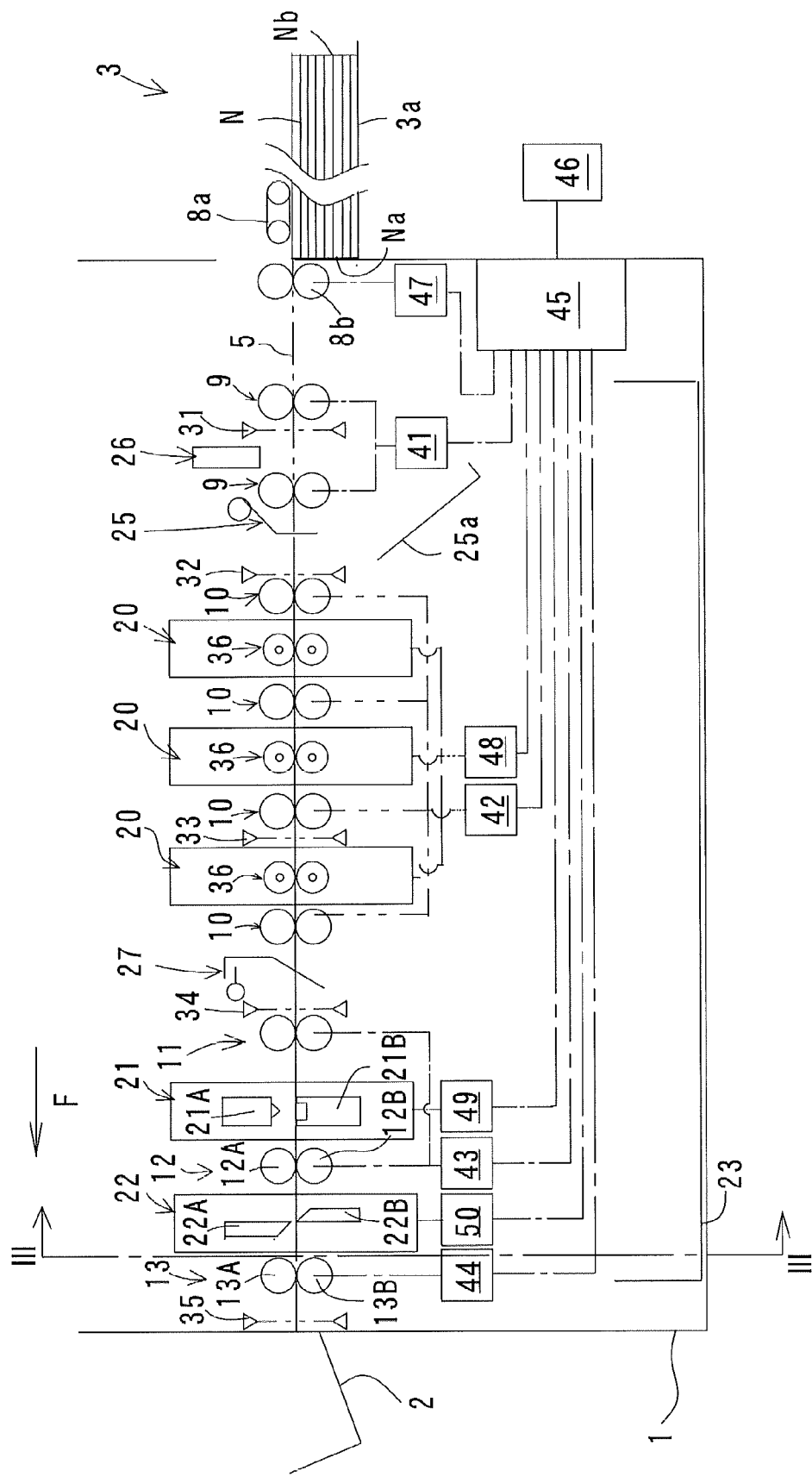
FIG. 1 is a schematic longitudinal sectional view of a sheet processing apparatus using a first invention of the present invention.

FIG. 1 is a schematic longitudinal sectional view of a sheet processing apparatus using a controlling method according to a first invention of the present invention. In FIG. 1, the sheet processing apparatus includes a sheet receiving section 2 at the downstream end in sheet conveying direction F in an apparatus body 1, a sheet feeding section 3 at the upstream end in sheet conveying direction F therein, and a substantially horizontal conveying path 5 between the sheet feeding section 3 and the sheet receiving section 2. A suction conveying belt mechanism 8a and a feeding roller 8b are arranged in the sheet feeding section 3. On the conveying path 5, a plurality of pairs of conveying rollers 9, 10, 11, 12, and 13 are spaced in sheet conveying direction F, and slit forming mechanisms 20, a fold forming mechanism 21, and a cutting mechanism 22 are arranged as processing mechanisms from the sheet conveying upstream side to the sheet conveying downstream side. In addition, a strip discharging section 23 is arranged at the lower end in the apparatus body 1, and accommodates a disposal strip after slitting and cutting.

A reject mechanism 25 and a CCD sensor 26 are arranged on the sheet conveying upstream side of the slit forming mechanism 20. A cut strip dropping mechanism 27 is arranged on the sheet conveying downstream side of the slit forming mechanisms 20. The slit forming mechanisms 20, the fold forming mechanism 21, and the cutting mechanism 22 are removable units, and can be removably mounted in desired positions in the apparatus body 1 by cassetting. Therefore, according to process, the arranging order of the mechanisms 20, 21, and 22 can be changed, the mechanisms 20, 21, and 22 can be replaced with other mechanisms (a chamfering mechanism, and a perforation forming mechanism), and other mechanisms (a chamfering mechanism, and a perforation forming mechanism) can be added.

The pairs of conveying rollers 9, 10, 11, 12, and 13 are connected to roller driving sources 41, 42, 43, and 44, respectively, via a power transmission mechanism. The roller driving sources 41, 42, 43, and 44 are electrically connected to a control section 45. The control section 45 incorporates a CPU, and a memory device, such as a RAM and a ROM. An operation panel 46 and the CCD sensor 26 are electrically connected to the interface of the control section 45 to input and display operation settings information.

Further, a plurality of optically transmission type sheet detection sensors 31, 32, 33, 34, and 35 are arranged on the conveying path 5, detect front edge (sheet conveying downstream edge) Na or rear edge (sheet conveying upstream edge) Nb of sheet N, and are electrically connected to the interface of the control section 45. The first sheet detection sensor 31 on the extreme sheet conveying upstream side of the conveying path 5 is arranged near the sheet conveying upstream side of the CCD sensor 26. The second sheet detection sensor 32 is arranged near the sheet conveying upstream side of the slit forming mechanisms 20. The third sheet detection sensor 33 is arranged midway in the slit forming mechanisms 20. The fourth sheet detection sensor 34 is arranged near the sheet conveying upstream side of the fold forming mechanism 21. The fifth sheet detection sensor 35 on the extreme sheet conveying downstream side of the conveying path 5 is arranged near the sheet conveying upstream side of the sheet receiving section 2.

The first sheet detection sensor 31 on the extreme conveying direction upstream side of the conveying path 5 detects front edge Na or rear edge Nb of sheet N fed from the sheet feeding section 3 and nipped between the pair of conveying rollers 9, and uniquely detects the position of sheet N conveyed on the conveying path 5 with reference to the detected sheet position.

The second sheet detection sensor 32 and the third sheet detection sensor 33 detect jamming of sheet N. The fourth sheet detection sensor 34 is auxiliary provided to correct sheet position information obtained from the first sheet detection sensor 31 more precisely when the conveying path 5 becomes long to cause accumulation of shifts (conveying errors) in sheet conveying direction F of sheet N on the conveying path 5. The fifth sheet detection sensor 35 detects conveying-out of product Q into the sheet receiving section 2 and jamming.

The present invention relates to the control of the cutting mechanism 22 and the pairs of conveying rollers 12 and 13 therenear of the sheet processing apparatus, and other processing mechanisms and sections will be briefly described.

"The Sheet Feeding Section 3"

The sheet feeding section 3 incorporates a suction conveying belt mechanism, and feeds a predetermined number of sheets N stacked on a sheet tray 3a one by one from the uppermost sheet onto the conveying path 5 by the suction conveying belt mechanism 8a and the feeding roller 8b. The feeding roller 8 and the suction conveying belt mechanism are connected to a sheet-feeding driving source 47 which is electrically connected to the control section 45.

"The CCD Sensor 26"

Figure 14:
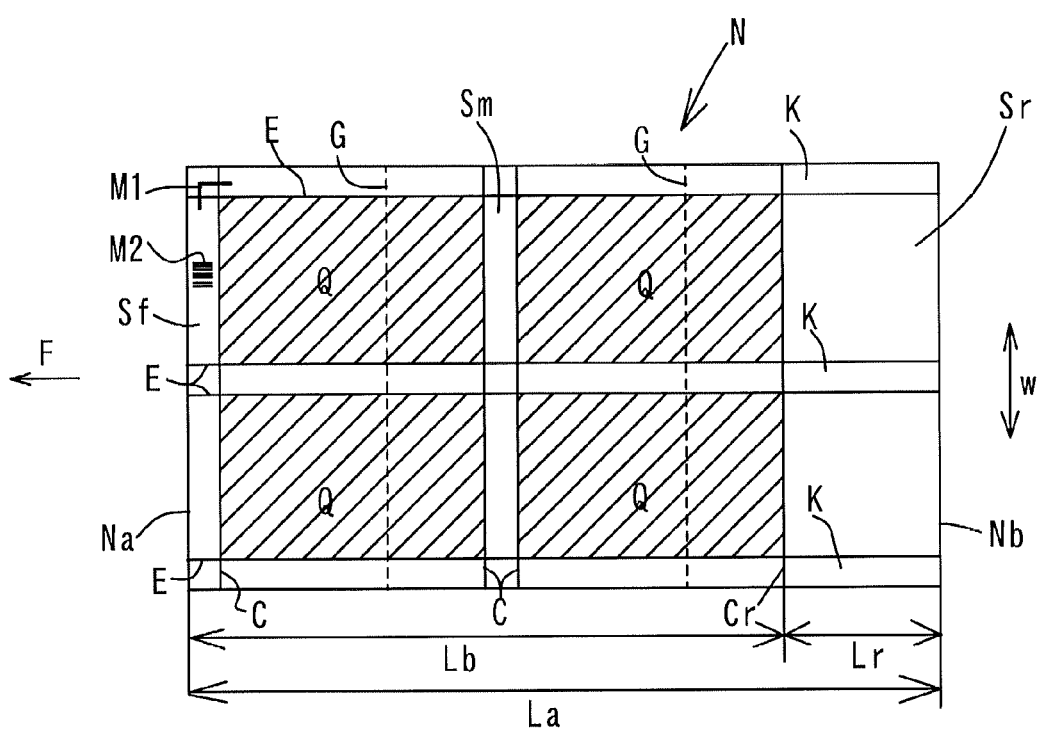
FIG. 14 is a plan view showing an example of the product array pattern of a sheet.

Aside from the manual input of operation settings information on the operation panel 46, the CCD sensor 26 can automatically read the operation settings information. Specifically, the CCD sensor 26 reads the image of position mark M1 printed at the front end corner of sheet N, as shown in FIG. 14, to detect the reference positions of the processes in sheet conveying direction F of sheet N and in sheet conveying width direction W orthogonal to the sheet conveying direction, and reads the image of barcode M2 printed at the front end of sheet N to obtain the operation settings information to be provided to sheet N. The operation settings information includes, for instance, entire length La in sheet conveying direction F and the entire width of sheet N, and the positions of cutting lines C, C, Cr, and E and folding line G according to the size, number, and arrangement of products Q to be processed. Length Lb in FIG. 14 denotes the length from front edge Na of sheet N to cutting line Cr at the conveying downstream end of rear end cut region Sr.

"The Reject Mechanism 25"

When the CCD sensor 26 cannot read printed position mark M1 and barcode M2 which are not clear, the reject mechanism 25 in FIG. 1 is operated with respect to unreadable sheet N to drop sheet N so that a disposal sheet tray 25a collects sheet N.

"The Slit Forming Mechanism 20"

In the embodiment, three slit forming mechanisms 20 are arrayed in sheet conveying direction F, and each of the slit forming mechanisms 20 includes two pairs of rotational blades 36, each pair including upper and lower rotational blades spaced in conveying width direction W. The lower rotational blade is connected to a rotational blade driving source 48, such as a motor, via a power transmission mechanism. That is, the lower rotational blade is rotated by the driving force of the rotational blade driving source 48 to form a slit with respect to sheet N in parallel with sheet conveying direction F. The interval in conveying width direction W between the pairs of rotational blades 36 can be optionally changed.

"The Cut Strip Dropping Mechanism 27"

The cut strip dropping mechanism 27 discharges a cut strip caused by cutting of the slit forming mechanism 20 (cut region K in FIG. 14) to the outside of the conveying path 5, and drops the cut strip into the strip discharging section 23 when sheet N passes through the cut strip dropping mechanism 27.

"The Fold Forming Mechanism 21"

The fold forming mechanism 21 includes a lower die 21B having an upper end concave portion, and an upper die 21A having a lower end convex portion fitted into the concave portion. The upper die 21A is connected to a die driving source 49, such as a motor, via a power transmission mechanism. That is, the upper die 21A is moved down by the driving force of the die driving source 49 to form a fold with respect to sheet N in sheet conveying width direction W orthogonal to sheet conveying direction F.

"The Cutting Mechanism 22"

The cutting mechanism 22 includes a lower fixed blade 22B and an upper movable blade 22A, which extend in sheet conveying width direction W. The upper movable blade 22A is connected to a cutting driving source 50, such as a motor, via a power transmission mechanism. To unify the words used in the claims, the pair of conveying rollers 12 on the sheet conveying upstream side of the cutting mechanism 22 are referred to as a pair of first conveying rollers, and the pair of conveying rollers 13 on the sheet conveying downstream side of the cutting mechanism 22 are referred to as a pair of second conveying rollers. The pair of first conveying rollers 12 and the pair of second conveying rollers 13 include lower conveying rollers 12B and 13B on the driving side, which are connected to the roller driving sources 43 and 44, respectively and upper conveying rollers 12A and 13A on the driven side.

Figure 2:
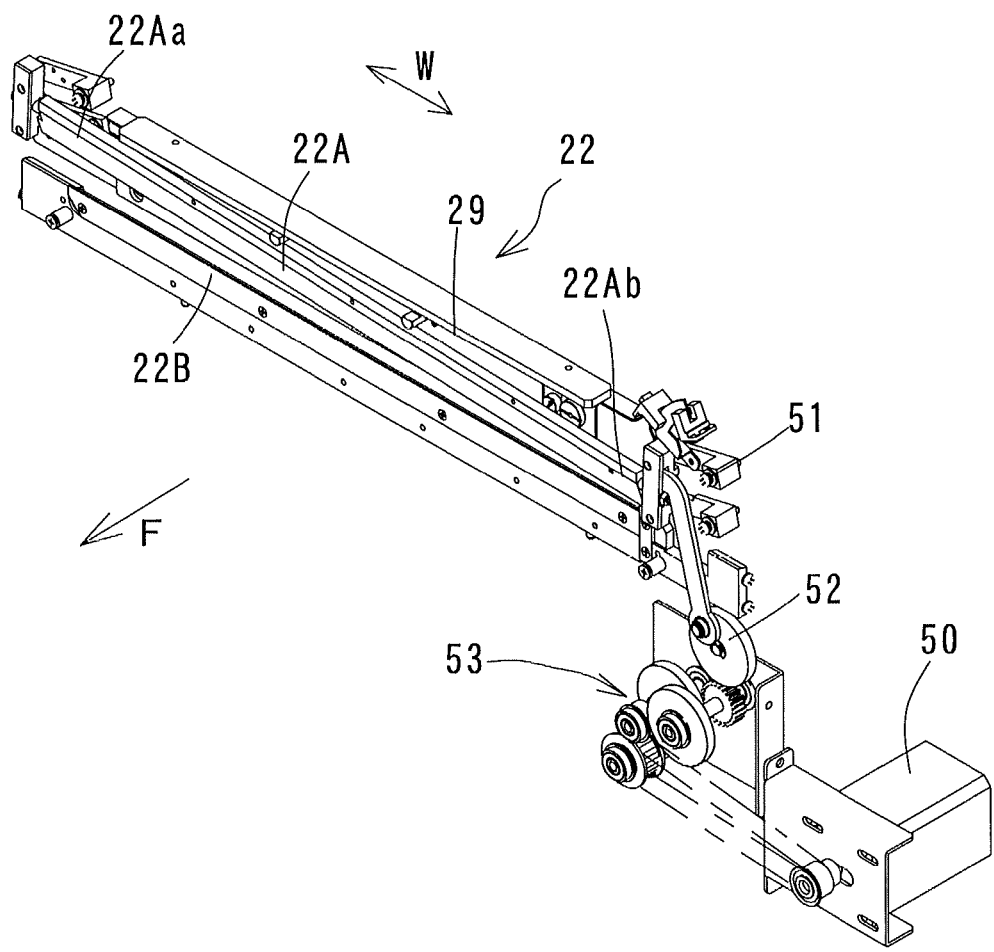
FIG. 2 is a perspective view of a cutting mechanism in FIG. 1.

FIG. 2 is a specific example of the cutting mechanism 22. The lower fixed blade 22B is substantially horizontally arranged to extend in sheet conveying width direction W. The upper movable blade 22A is tilted with respect to a horizontal direction to be lowered from a blade distal portion 22Aa to a blade base portion 22Ab, and is moved in an up-down direction along an upper guide body 29 arranged on the upstream side in sheet conveying direction F.

The blade base portion 22Ab of the upper movable blade 22A is engaged with the cutting driving source (driving motor) 50 via a parallel link mechanism 51, a crank mechanism 52, and a gear transmission mechanism 53. By the driving power from the cutting driving source 50, the upper movable blade 22A in tilted state is moved in parallel with the up-down direction.

Figure 3:
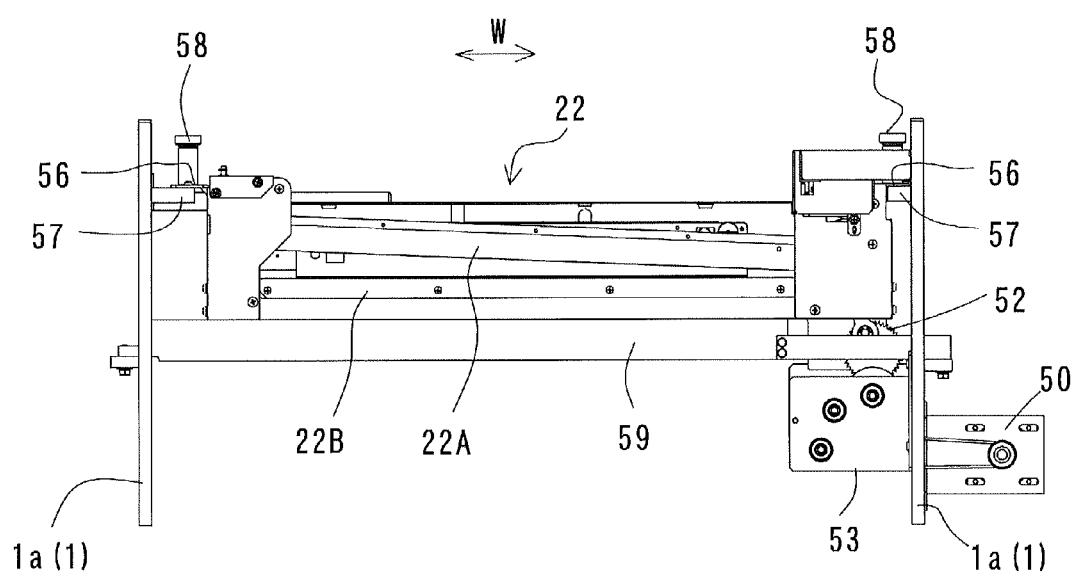
FIG. 3 is an enlarged cross-sectional view taken along line III-III of the fine-cutting mechanism in FIG. 1.

As shown in FIG. 3, the cutting mechanism 22 includes mounting members 56 at both upper ends thereof in sheet conveying width direction W. These mounting members 56 are fixed to support bases 57 provided at the upper ends of a pair of vertical walls 1a of the apparatus body 1 with bolt units 58. In addition, the lower end of the cutting mechanism 22 is placed on a cross member 59 extended between the vertical walls 1a.

Figure 5:
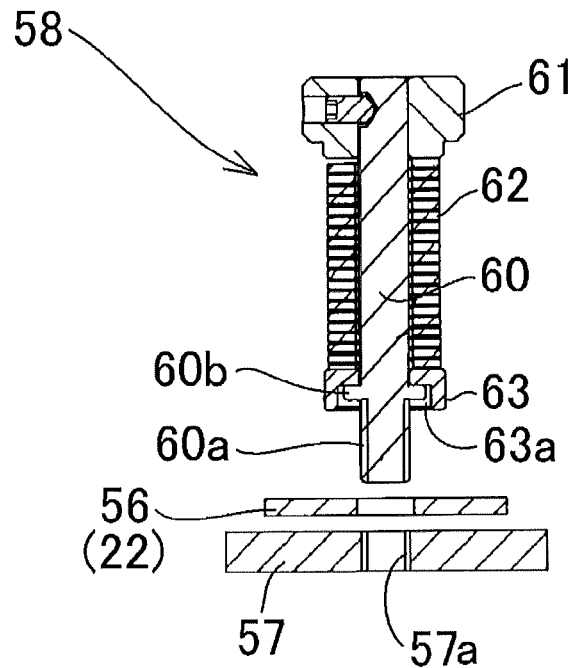
FIG. 5 is an enlarged longitudinal sectional view of the bolt unit in FIG. 4.

The bolt units 58 cannot be loosened by vibration. That is, in FIG. 5, each of the bolt units 58 includes a bolt shaft 60, a bolt head 61 fixed onto the upper end of the bolt shaft 60, a retaining ring 63 fitted to the bolt shaft 60 to be axially movable, and a coil spring 62 contracted between the retaining ring 63 and the bolt head 61. A male screw 60a is formed at the lower end of the bolt shaft 60. A brim 60b is integrally formed at the upper end of the male screw 60a. The retaining ring 63 is formed with a concave portion 63a in the lower surface thereof. The concave portion 63a accommodate the brim 60b of the bolt shaft 60. The coil spring 62 urges the retaining ring 63 downward to press the retaining ring 63 onto the upper surface of the brim 60b.

Figure 4:
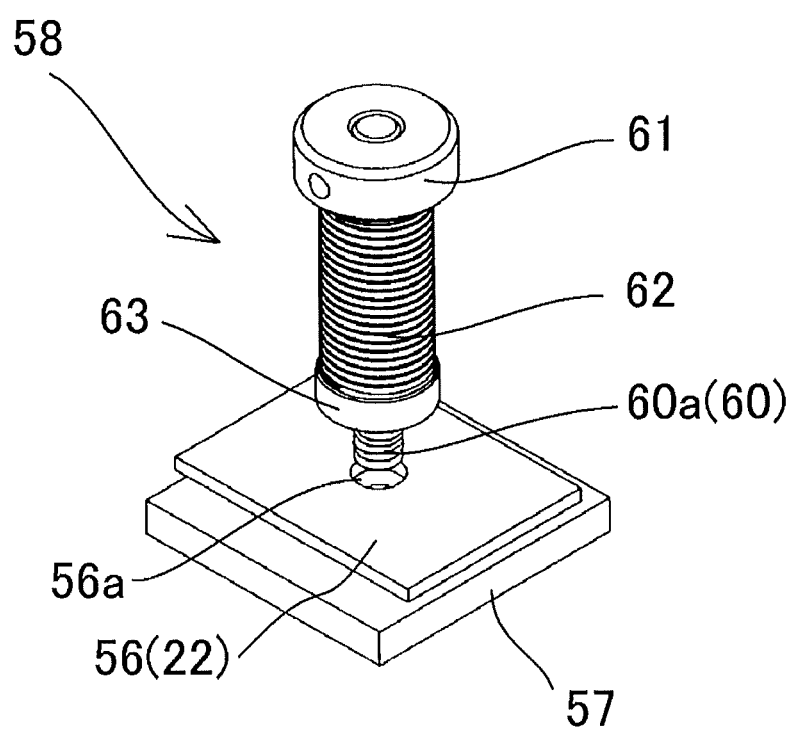
FIG. 4 is a perspective view of a fixing bolt unit of the cutting mechanism.
Figure 6:
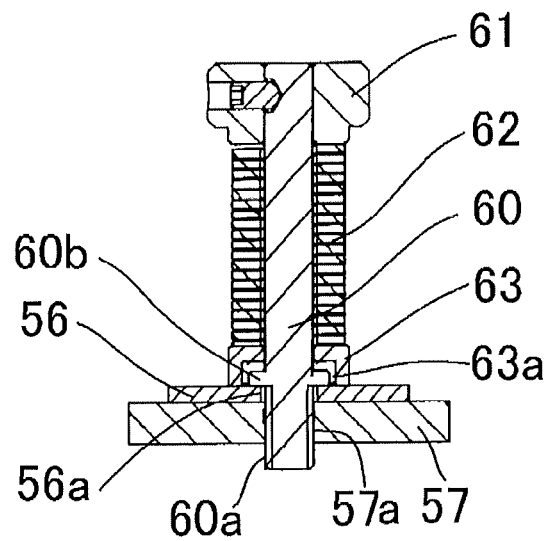
FIG. 6 is an enlarged longitudinal sectional view of the bolt unit in FIG. 4 in a fixed state.

As shown in FIG. 4, to assemble the cutting mechanism 22, each of the mounting members 56 of the cutting mechanism 22 is placed on each of the support bases 57 of the apparatus body 1, so that the male screw 60a at the lower end of the bolt shaft 60 is inserted through a bolt insertion hole 56a in the mounting member 56 and as shown in FIG. 6, is screwed into a female screw hole 57a in the support base 57. The male screw 60a is screwed into the female screw hole 57a, then, the lower end of the retaining ring 63 is abutted onto the mounting member 56 to screw the male screw 60a further into the female screw hole 57a, so that the retaining ring 63 compresses the coil spring 62. The resilient force of the compressed coil spring 62 urges the bolt shaft 60 upward via the bolt head 61 to abut the tooth surface of the male screw 60a onto the tooth surface of the female screw hole 57a. With this, the bolt unit 58 cannot be loosened by severe vibration.

"The Product Array Pattern of the Sheet"

Although already described in the section of the conventional art, in the array pattern of products Q shown in FIG. 14, four products Q having folds are manufactured from one sheet N. Basically, four cutting lines C and Cr extending in sheet conveying width direction W, four slitting lines E extending in parallel with sheet conveying direction F, and four folding lines G extending in sheet conveying width direction W are set, so that sheet N is cut on these cutting lines C, Cr, and E to form folds on folding lines G, thereby manufacturing four products Q having folds.

"The Control Contents of the Control Section 45 for the Cutting Mechanism 22"

A program including the following steps for the cutting process is incorporated into the control section 45 in FIG. 1.

Figure 15:
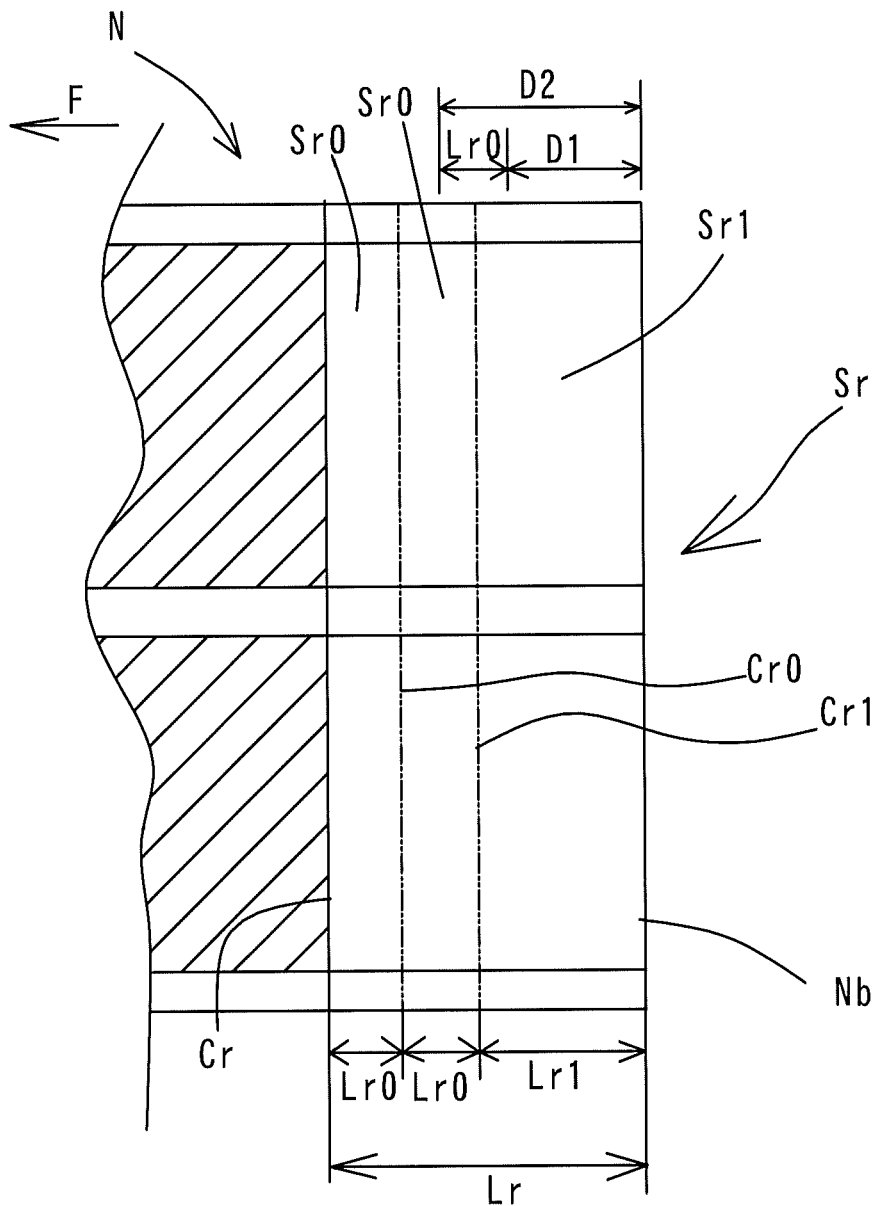
FIG. 15 is a partially enlarged plan view of the sheet in FIG. 14 at the time of cutting and dividing the rear end cut region according to the present invention.

(1) In a first step, based on the input value of operation settings information from the operation panel 46 or the CCD sensor 26 in FIG. 1, it is determined whether or not sheet conveying direction length Lr of rear end cut region Sr shown in FIG. 14 is equal to or more than predetermined value Dn. As shown in FIG. 15, when it is determined that sheet conveying direction length Lr of rear end cut region Sr is equal to or more than predetermined value Dn, cutting lines Cr0 and Cr1 for cutting and dividing rear end cut region Sr into predetermined fine-cutting unit length Lr0 from the sheet conveying downstream end thereof are set.

Figure 7:
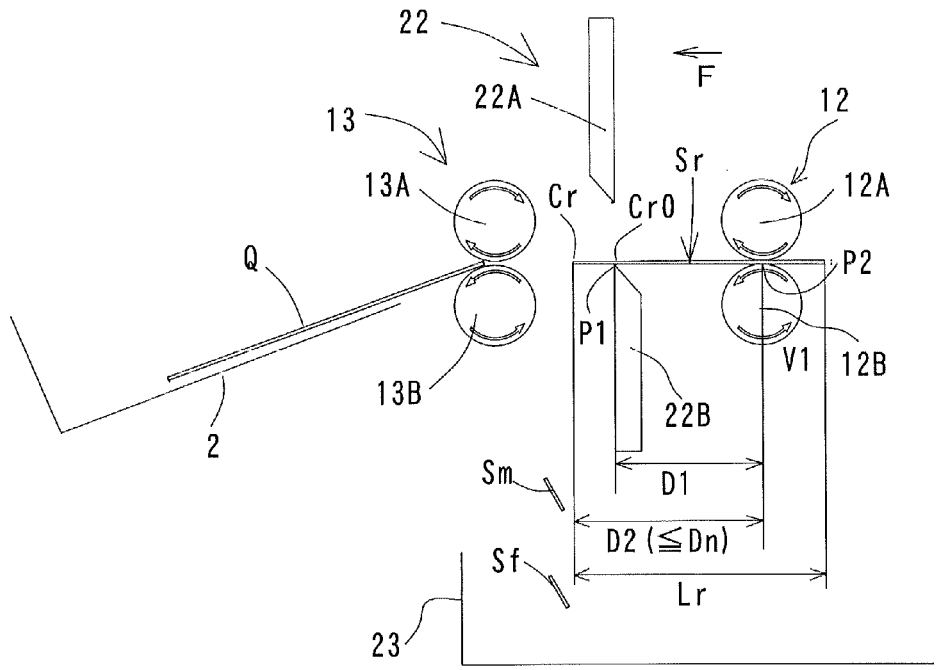
FIG. 7 is a schematic cross-sectional view showing an early-stage conveyed state in a process for finely cutting and dividing a rear end cut region according to the first invention.
Figure 8:
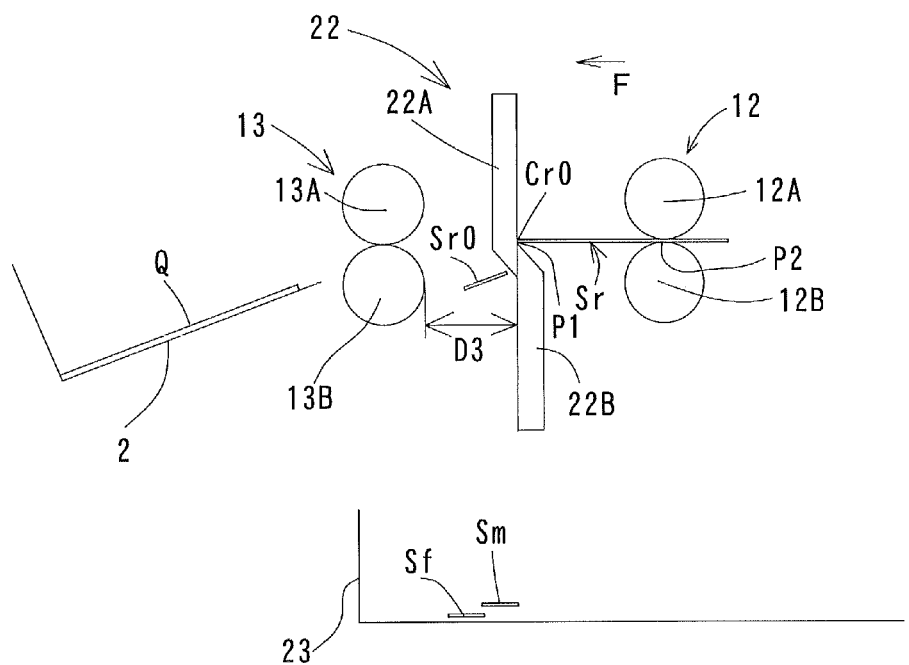
FIG. 8 is a schematic cross-sectional view showing a cut state after conveying in FIG. 7.
Figure 9:
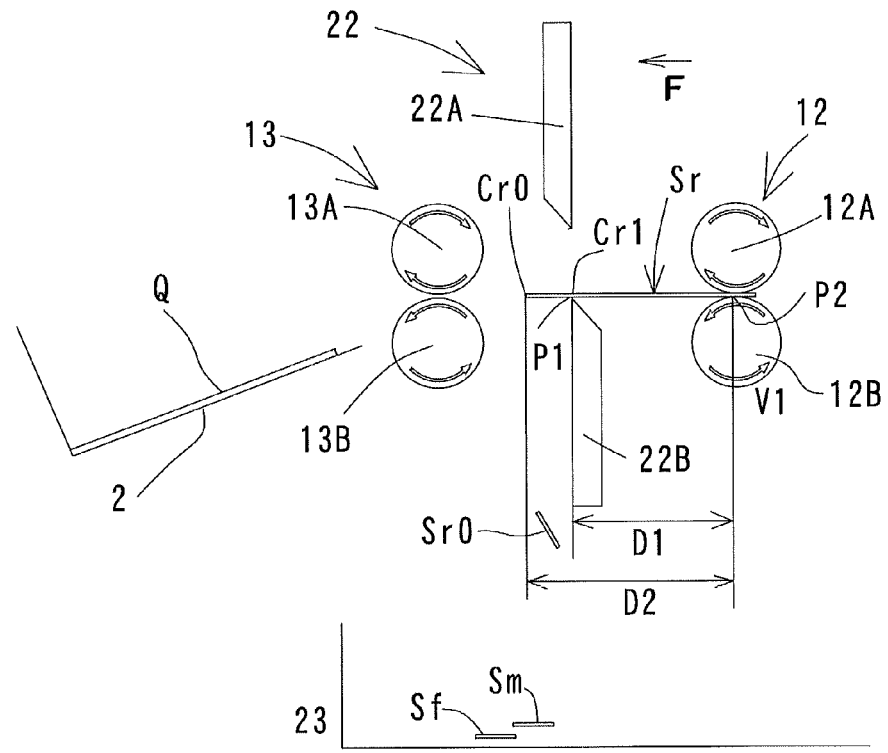
FIG. 9 is a schematic cross-sectional view showing a conveyed state after cutting in FIG. 8.

As shown in FIG. 8, predetermined fine-cutting unit length Lr0 is set to be the length to the extent that the cut strip in finely-cut divided region Sr0 can be immediately discharged downward from gap D3 between the cutting mechanism 22 and the pair of second conveying rollers 13 on the sheet conveying downstream side. As shown in FIG. 7, predetermined value Dn which is the determination reference of whether or not the cutting and dividing operation is performed is set to be equal to or more than the length in which predetermined fine-cutting unit length Lr0 is added to later-described minimum reference length D1 corresponding to the distance between cutting position P1 of the cutting mechanism 22 and nipping position P2 of the pair of first conveying rollers 12 (later-described maximum reference length D2). However, to prevent conveying of long rear end cut region Sr to the pair of second conveying rollers 13 as it is without being divided, predetermined value Dn is set to be the value which is equal to or more than maximum reference length D2 and is less than the length in which predetermined fine-cutting unit length Lr0 is added to maximum reference length D2.

Figure 10:
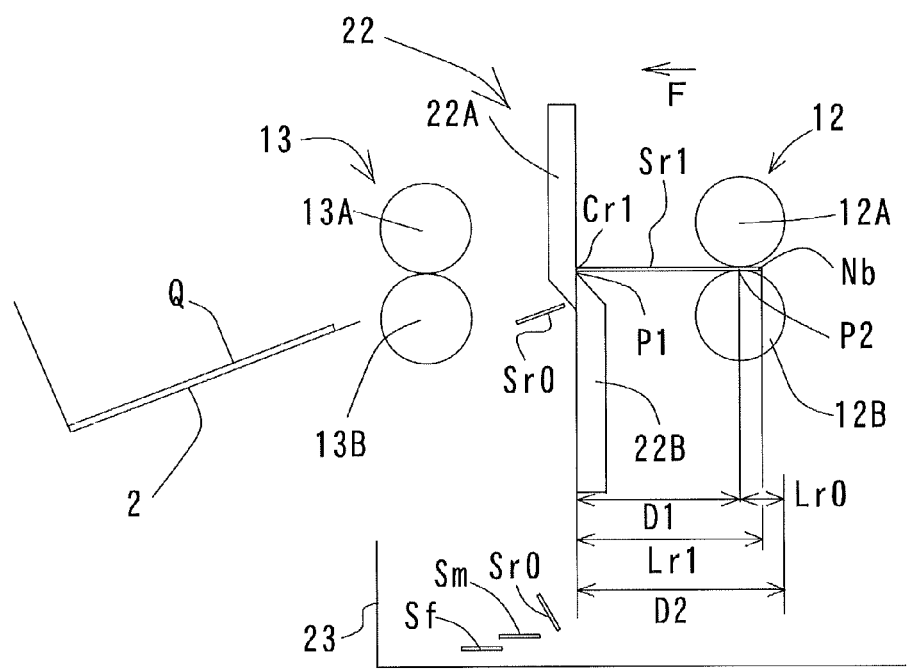
FIG. 10 is a schematic cross-sectional view showing a state where a rearmost end divided region is cut after conveying in FIG. 9.

(2) In a second step, as shown in FIG. 10, when sheet conveying direction length Lr1 of rearmost end divided region Sr1 which is left last is equal to or more than above described minimum reference length D1 corresponding to the distance between cutting position P1 and nipping position P2 of the pair of first conveying rollers 12 and is less than above described maximum reference length D2 in which predetermined fine-cutting unit length Lr0 is added to minimum reference length D1, the setting of cutting lines C0 and Cr1 for division in FIG. 15 is completed.

In the embodiment, predetermined fine-cutting unit length Lr0 is set to be 14 mm, minimum reference length D1 is set to be 25 mm, maximum reference length D2 is set to be 28 mm (25 mm+3 mm), and predetermined value Dn which is the determination reference of whether or not the fine-cutting and dividing operation is performed is set to be 39 mm (25 mm+14 mm).

For instance, sheet conveying direction length Lr of rear end cut region Sr in FIG. 14 is 60 mm, which is longer than predetermined value Dn=39 mm, so that as shown in FIG. 15, two cutting lines Cr0 and Cr1 for division are set into rear end cut region Sr from the sheet conveying downstream end thereof, and rearmost end divided region Sr1 whose conveying direction length Lr1 is 60 mm−14 mm×2=32 mm is left while the cutting lines for division are not set. That is, rearmost end cut region Sr1 whose sheet conveying direction length Lr1=32 mm is equal to or more than minimum reference length D1=25 mm and is less than maximum reference length D2=39 mm is left while the cutting lines for division are not set.

Figure 11:
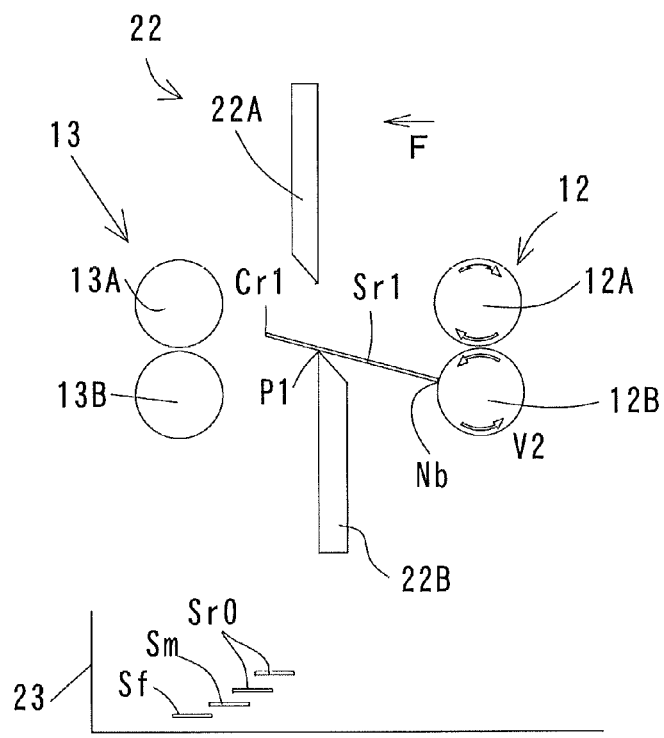
FIG. 11 is a schematic cross-sectional view showing a state where the cut strip in the rearmost end divided region after cutting is guided downward at a limited conveying speed.
Figure 12:
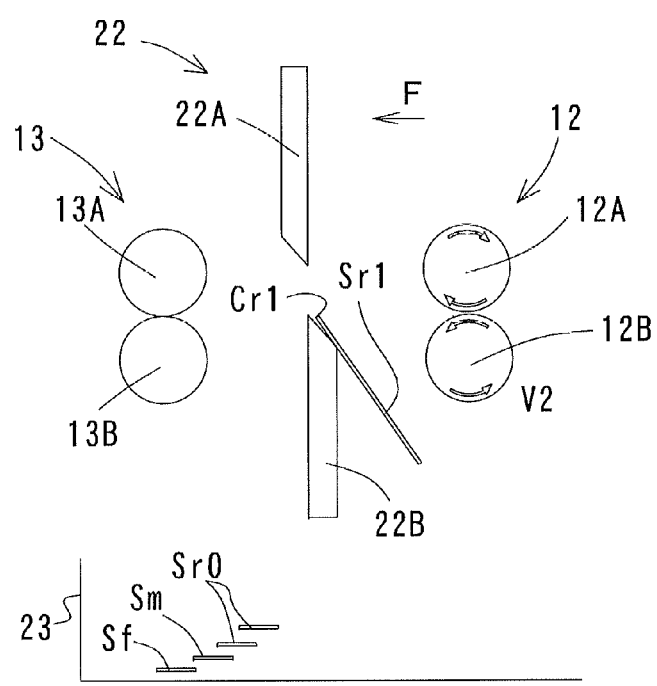
FIG. 12 is a schematic cross-sectional view showing a state where the cut strip in the rearmost end divided region is dropped.

(3) In a third step, the substantial operation control of the cutting mechanism 22 and the pair of first conveying rollers 12 is performed. As shown in FIGS. 7 to 12, in the cutting operation for rear end cut region Sr on cutting line Cr, first cutting line Cr0 for division, and second cutting line Cr1 for division, the pair of first conveying rollers 12 are controlled to be driven at normal conveying speed V1 (e.g., 600 mm/sec or more). As shown in FIGS. 11 and 12, after cutting on second cutting line Cr1 for division in FIG. 10, while the cutting mechanism 22 is held opened, that is, the upper movable blade 22A is held raised, the pair of first conveying rollers 12 are controlled to be temporarily driven at limited conveying speed V2 (e.g., 500 mm/sec or less) lower than normal conveying speed V1.

Figure 13:
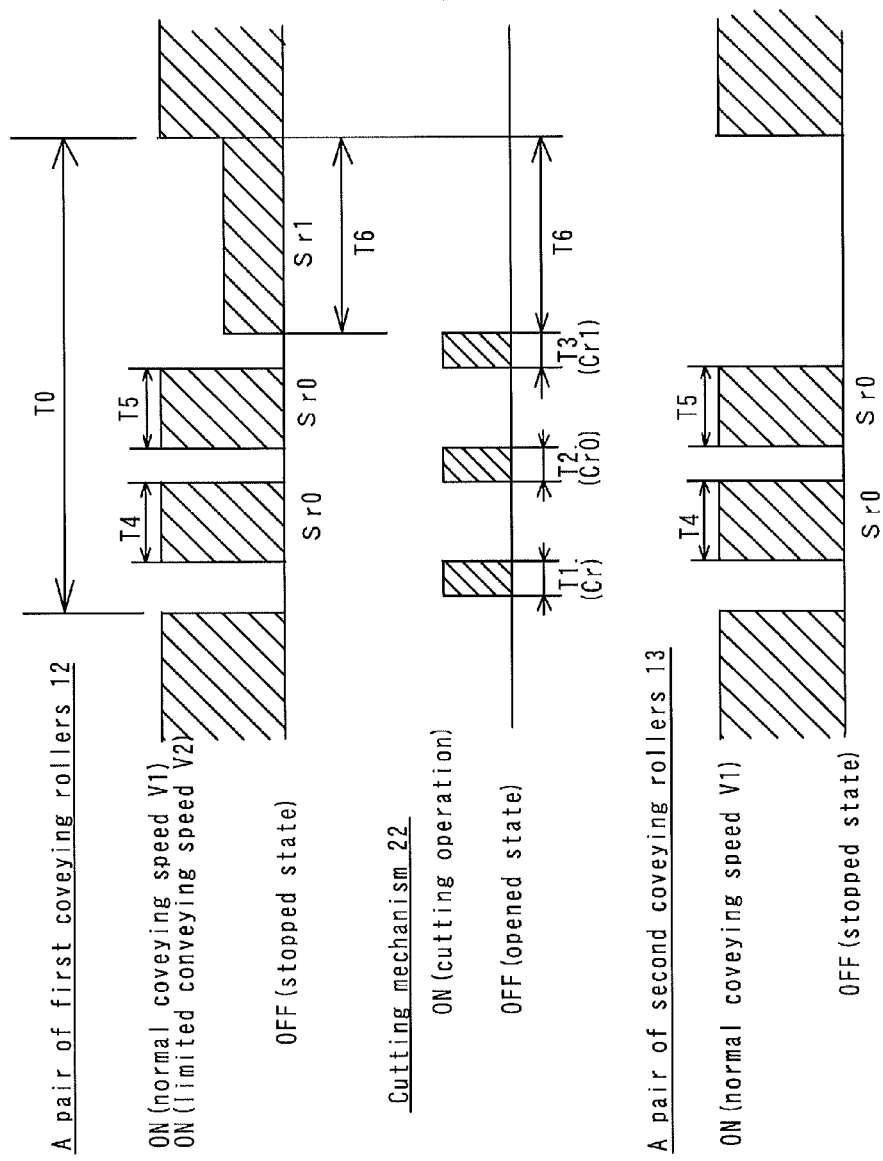
FIG. 13 is a time chart of operations of operating sections at the time of finely cutting and dividing the rear end cut region according to the present invention.

FIG. 13 is a time chart of operations of the pair of first conveying rollers 12, the pair of second conveying rollers 13, and the cutting mechanism 22 in the third step. T0 indicates time from start of cutting (Cr) of rear end cut region Sr to completion of discharge of rearmost end divided region Sr1. T1, T2, and T3 indicate cutting operation time on cutting lines Cr, Cr0, and Cr1 for division. T4 and T5 indicate conveying time of the pair of first conveying rollers 12 at normal conveying speed V1 after cutting on cutting lines Cr and Cr0. T6 indicates operation time during which the cut strip in rearmost end divided region Sr1 is discharged by the pair of first conveying rollers 12 at limited conveying speed V2 after cutting on second cutting line Cr1 for division.

[The Overview of the Entire Operation of the Sheet Processing Apparatus]

(1) In FIG. 1, operation settings information about sheet size and type and the array, number, and size of products is inputted on the operation panel 46. The operation settings information can be automatically inputted in place of the manual input, or in cooperation with the manual input, by the reading of barcode M2 by the CCD sensor 26.

(2) A plurality of sheets N stacked on the tray 3a of the sheet feeding section 3 in FIG. 1 are fed one by one from the uppermost sheet onto the conveying path 5 by the suction conveying belt mechanism 8a and the feeding roller 8b.

(3) The CCD sensor 26 reads position mark M1 and barcode M2 on sheet N, as needed, to obtain operation settings information to be provided to sheet N.

(4) When sheet N cannot be read by the CCD sensor 44, the CCD sensor 44 is operated to unreadable sheet N to drop sheet N so that the disposal sheet tray 25a collects sheet N.

(5) The slit forming mechanisms 20 cut sheet N on a plurality of slitting lines E in parallel with sheet conveying direction F.

(6) The cut strip dropping mechanism 27 drops the cut strip (cut region K in FIG. 14) cut by the slit forming mechanisms 20 into the strip discharging section 23.

(7) The fold forming mechanism 21 forms a fold on folding line G in sheet conveying width direction W.

(8) The pair of first conveying rollers 12 feed sheet N into the cutting mechanism 22 at normal conveying speed V1, and the cutting mechanism 22 cuts sheet N on cutting lines C and Cr in FIG. 14. As shown in FIG. 7, the cut strips in front end cut region Sf and middle cut region Sm after cutting pass through between the cutting mechanism 22 and the pair of second conveying rollers 13 to be discharged downward into the strip discharging section 23. On the other hand, the cut strip in rear end cut region Sr is discharged by the following different method according to the value of sheet conveying direction length Lr.

(8-1)

In FIG. 7, sheet conveying direction length Lr of rear end cut region Sr is equal to or more than predetermined value Dn. As shown in FIGS. 7 to 10, rear end cut region Sr is cut into divided region Sr0 having predetermined fine-cutting unit length Lr0 from the sheet conveying direction downstream end thereof. Cut strip (Sr0) is discharged sequentially from between the cutting mechanism 22 and the pair of second conveying rollers 13 downward into the strip discharging section 23. In this case, the conveying speed of the pair of first conveying rollers 12 is normal conveying speed V1.

As shown in FIG. 10, cutting on last cutting line Cr1 for division is performed. As shown in FIG. 11, the upper movable blade 22A is raised to hold the cutting mechanism 22 opened so that the pair of first conveying rollers 12 are slowly rotated at limited conveying speed V2. With this, while the front portion of the cut strip in rearmost end cut region Sr1 is supported by the lower fixed blade 22B, rear edge Nb is slowly guided forward and downward by the lower conveying roller 12B of the pair of first conveying rollers 12. As shown in FIG. 12, finally, rearmost end divided region Sr1 which is greatly vertically tilted passes through between the cutting mechanism 22 and the pair of first conveying rollers 12 to be immediately discharged downward into the strip discharging section 23.

(8-2)

When sheet conveying direction length Lr of rear end cut region Sr shown in FIG. 14 is less than predetermined value Dn, the cutting and dividing operation as shown in FIGS. 7 to 10 is not performed. That is, after cutting on cutting line Cr, rear end cut region Sr is discharged downward from between the cutting mechanism 22 and the pair of first conveying rollers 12. At the time of cutting on cutting line Cr, at least the region of product Q is nipped between the pair of second rollers 13. Therefore, unlike the conventional example in FIG. 22, rear edge Nb of rear end cut region Sr cannot be lifted and stayed.

However, as shown in FIGS. 11 and 12 (as in the control in 8-1), when sheet conveying direction length Lr of rear end cut region Sr is less than predetermined value Dn and is more than minimum reference value D1, after cutting rear end cut region Sr, the upper movable blade 22A is raised to hold the cutting mechanism 22 opened, and the pair of first conveying rollers 12 are slowly rotated at limited conveying speed V2 lower than the normal conveying speed. Then, the cut strip in rear end cut region Sr can be reliably discharged.

The Effects of the Embodiment of the First Invention (1) When as shown in FIGS. 7 to 10, rear end cut region Sr of sheet N is finely cut and divided into predetermined fine-cutting unit length Lr0, if as shown in FIG. 10, sheet conveying direction length Lr1 of rearmost end divided region Sr1 is equal to or more than minimum reference length D1 corresponding to the distance between cutting position P1 of the cutting mechanism 22 and nipping position P2 of the pair of first conveying rollers 12 and is less than maximum reference length D2 in which predetermined fine-cutting unit length Lr0 is added to minimum reference length D1, as shown in FIG. 11, the cutting mechanism 22 is held opened immediately after the downstream edge of rearmost end divided region Sr1 is cut, and the pair of first conveying rollers 12 are then driven at limited conveying speed V2 lower than normal conveying speed V1. Then, rear edge (Nb) of the cut strip in rearmost end divided region Sr1 is placed on the lower conveying roller 12B on the driving side to be slowly guided forward and downward, and passes through between the cutting mechanism 22 and the pair of first conveying rollers 12 to be reliably discharged downward into the strip discharging section 23. With this, sheet jamming, sheet damaging, and discharging of the cut strip into the sheet receiving section together with the product can be eliminated.

(2) The lower conveying roller 12B of the pair of first conveying rollers 12 arranged on the sheet conveying upstream side of the cutting mechanism 22 is a driving roller. Therefore, the lower conveying roller 12B can be rotated to reliably guide rearmost end divided region Sr1.

(3) Predetermined fine-cutting unit length Lr0 is set to be equal to or less than interval D3 in sheet conveying direction F between the cutting mechanism 22 and the pair of second conveying rollers 13. Therefore, the cut strip in divided region Sr0 which is divided into predetermined fine-cutting unit length Lr0 can be reliably discharged downward from between the cutting mechanism 22 and the pair of second conveying rollers 13 on the sheet conveying downstream side without being stayed.

(4) The normal conveying speed is equal to or more than approximately 600 mm/sec, and the limited conveying speed is equal to or less than approximately 500 mm/sec. Therefore, while the operation efficiency of the entire sheet processing apparatus can be improved, the problems, such as sheet jamming, can be reliably eliminated.

The Embodiment of a Second Invention

A sheet processing apparatus used in the embodiment of a second invention is the same as the sheet processing apparatus used in the embodiment of the first invention described with reference to FIGS. 1 to 6 except for the control contents of the control section 45 for the cutting mechanism 22.

(The Control Contents of the Control Section 45 for the Cutting Mechanism 22)

To describe the control contents, in addition to the portions and dimension signs D1, D2, and D3 between the portions, which have been described with reference to FIGS. 7 and 8, dimension signs D4 and D5 are shown in the cutting mechanism 22 in FIG. 16. That is, as described above, dimension sign D1 denotes the distance between cutting position P1 and nipping position P2 of the pair of first conveying rollers 12 (the minimum reference length), D2 denotes the maximum reference length (FIG. 7), and D3 denotes the interval between the cutting mechanism 22 (the lower fixed blade 22B) and the pair of second conveying rollers 13. In addition to these, D4 denotes the interval between the cutting mechanism 22 (the lower fixed blade 22B) and the pair of first conveying rollers 12, and D5 denotes the diameter of the lower conveying roller 12B of the pair of first conveying rollers 12. In the embodiment of the second invention, the same components and portions as the embodiment of the first invention are indicated by similar reference numerals.

In the embodiment of the second invention, a program including the following steps for the cutting process is incorporated into the control section 45 in FIG. 1.

(1) In a first step, based on the input value of operation settings information from the operation panel 46 or the CCD sensor 26 in FIG. 1, it is determined whether or not sheet conveying direction length Lr of rear end cut region Sr shown in FIG. 14 is more than predetermined value Dn. As shown in FIG. 17, when it is determined that sheet conveying direction length Lr of rear end cut region Sr is more than predetermined value Dn, the positions of cutting line Cr0 for cutting and dividing rear end cut region Sr into predetermined fine-cutting unit length Lr0 from the sheet conveying downstream end thereof and last cutting line Cr1 are set. As shown in FIG. 16, in the embodiment, predetermined value Dn which is the determination reference of whether or not the cutting and division operation is performed is set to be the value substantially corresponding to distance D1 between cutting position P1 of the cutting mechanism 22 and nipping position P2 of the pair of first conveying rollers 12. In the embodiment, diameter D5 of the lower conveying roller 12B of the pair of first conveying rollers 12 is 19.1 mm$\phi$.

Figure 16:
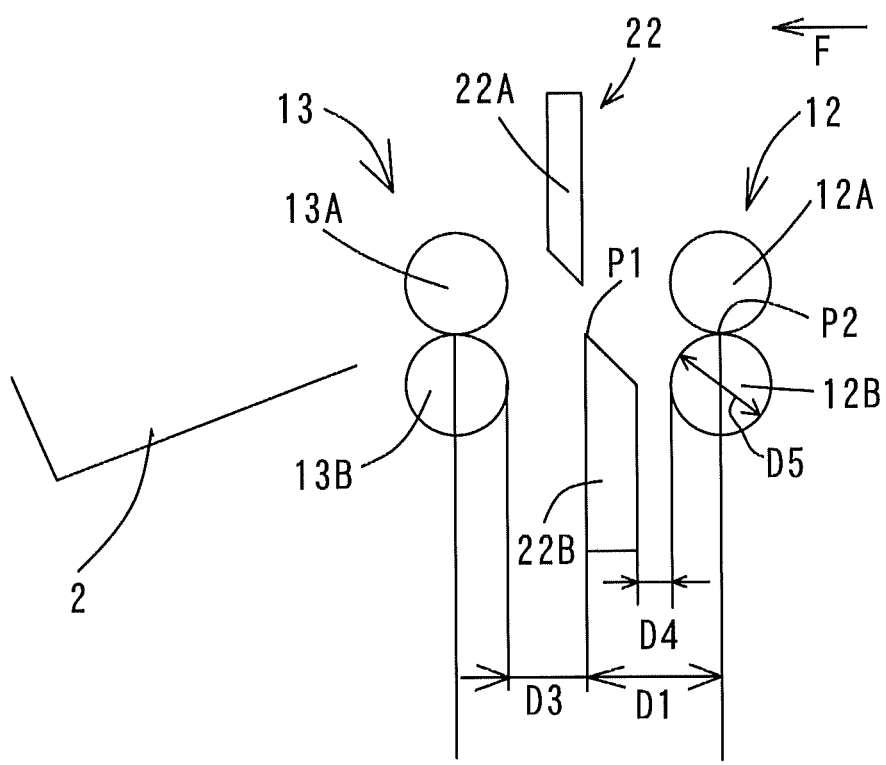
FIG. 16 is an enlarged longitudinal sectional view of the cutting mechanism embodying a second invention of the present invention, in which the substantial configuration is the same as FIG. 7.
Figure 17:
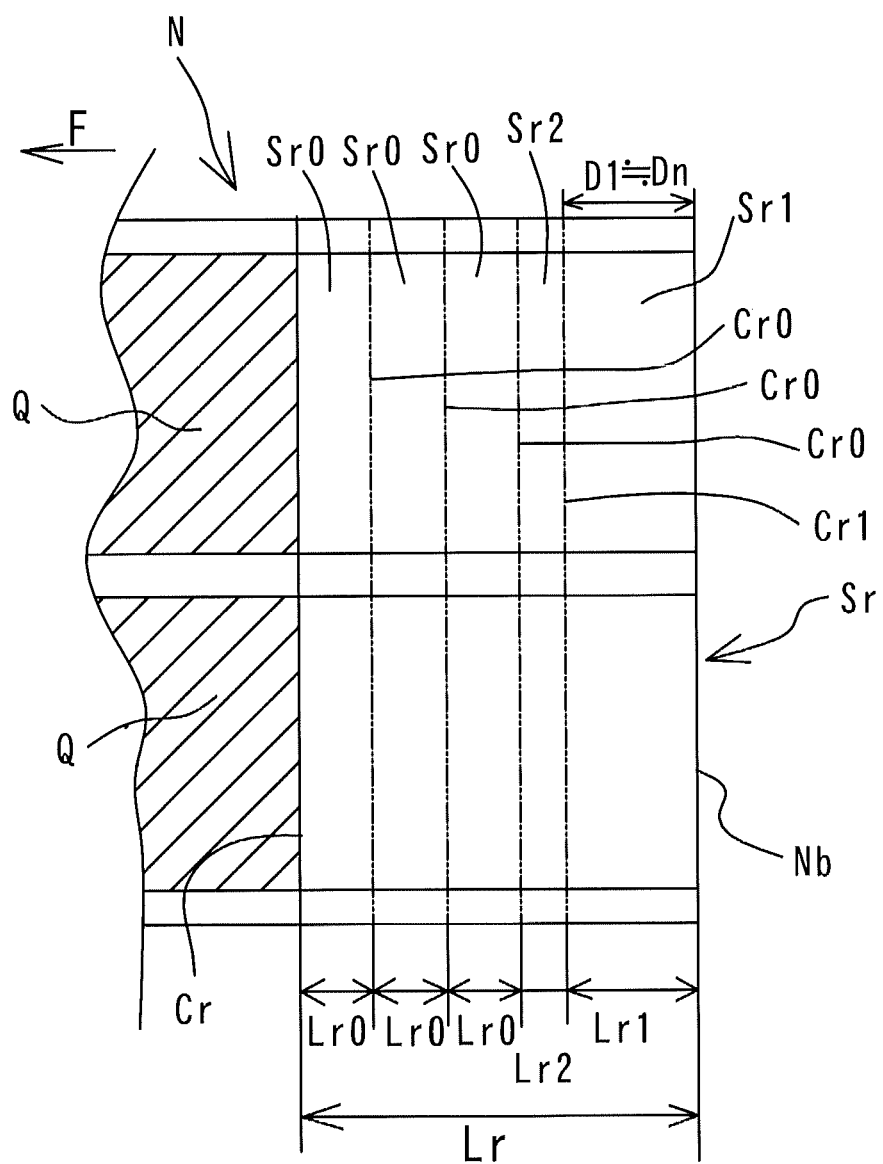
FIG. 17 is a partially enlarged plan view of the sheet in FIG. 14 at the time of cutting and dividing the rear end cut region according to the second invention.

In FIG. 16, predetermined fine-cutting unit length Lr0 is set to be the length to the extent that the cut strip in finely cut divided region Sr0 can be immediately discharged downward from gap D3 between the cutting mechanism 22 and the pair of second conveying rollers 13 on the sheet conveying downstream side.

(2) In a second step, as shown in FIG. 17, the position of last cutting line Cr1 is set so that sheet conveying direction length Lr1 of rearmost end divided region Sr1 which is left last substantially corresponds to distance D1 between cutting position P1 and nipping position P2 of the pair of first conveying rollers 12 (in this embodiment, Lr1=Dn). In this case, sheet conveying direction length Lr2 of cut region Sr2 next to rearmost end divided region Sr1 is 0≤Lr2≤Lr0. Then, the setting of cutting lines Cr0 and Cr1 for division in FIG. 17 is ended.

In the embodiment, gap D3 between the cutting mechanism 22 and the pair of second conveying rollers 13 on the sheet conveying downstream side is approximately 15 mm, so that predetermined fine-cutting unit length Lr0 is set to be 14 mm, and predetermined value Dn (≈D1) is set to be 25 mm. For instance, when sheet conveying direction length Lr of rear end cut region Sr in FIG. 14 is 72 mm, Lr is more than predetermined value Dn=25 mm, so that as shown in FIG. 17, three cutting lines Cr0 for division are set into rear end cut region Sr sequentially from the sheet conveying downstream end thereof, and last cutting line Cr1 is set so that conveying direction length Lr1 of rearmost end divided region Sr1 is 25 mm. Therefore, sheet conveying direction length Lr2 of divided region Sr2 next to rearmost end divided region Sr1 is Lr2=72−(14×3)−25=5 (mm).

Figure 18:
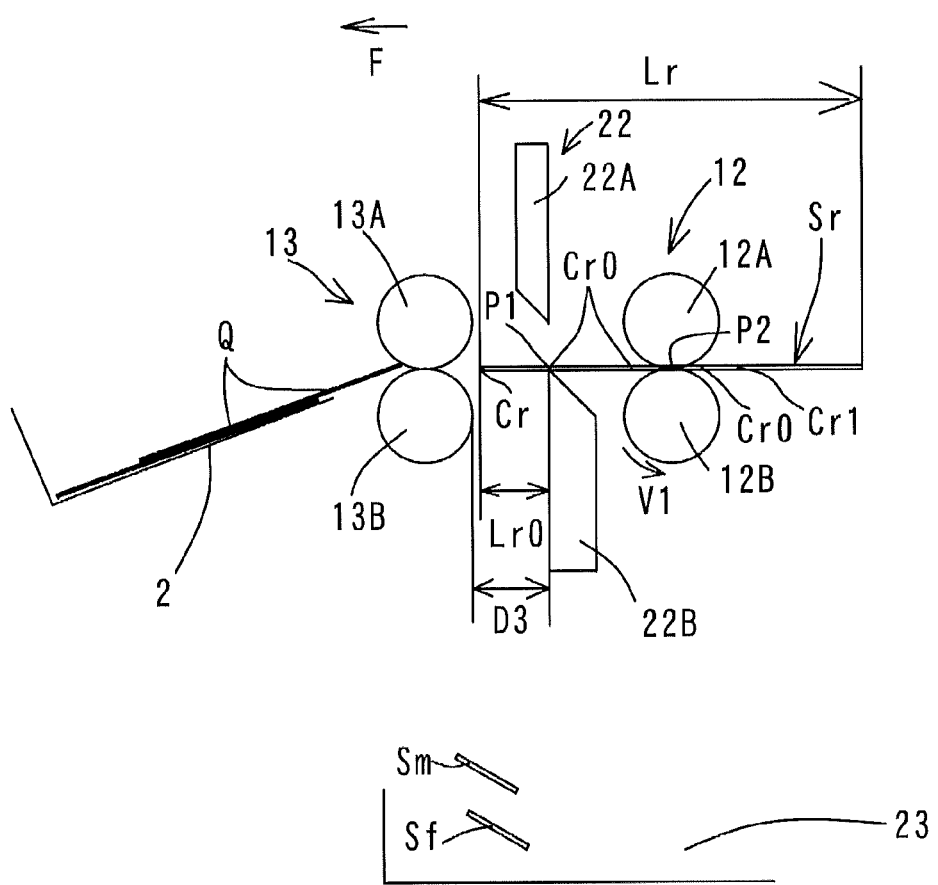
FIG. 18 is a schematic cross-sectional view showing an early-stage conveyed state in a process for finely cutting and dividing the rear end cut region.
Figure 19:
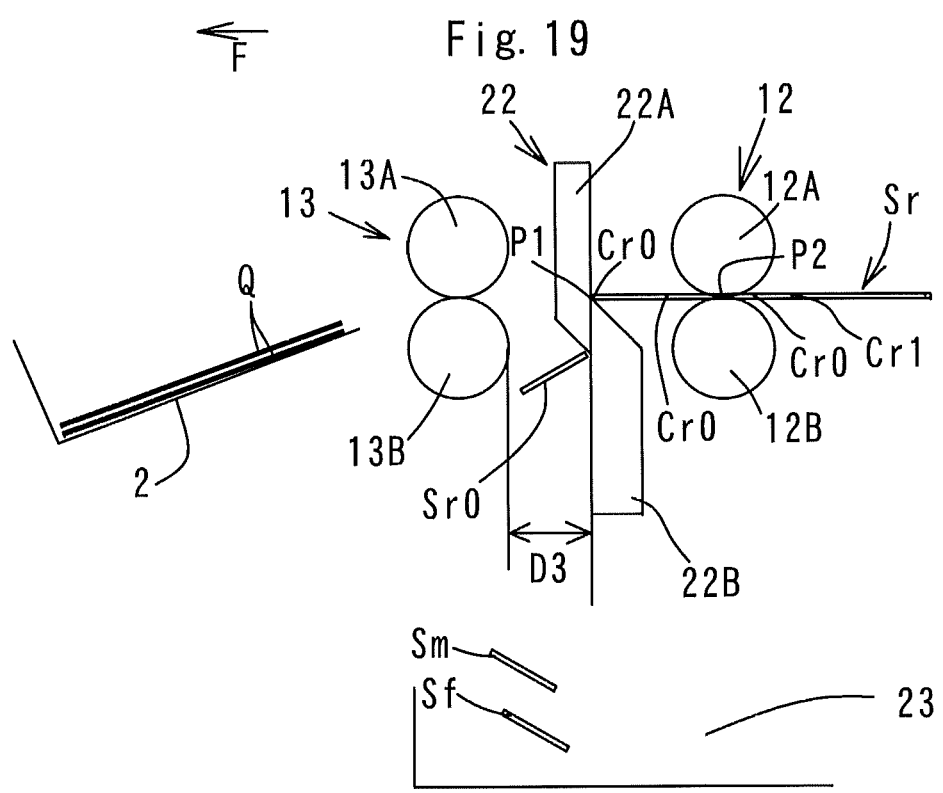
FIG. 19 is a schematic cross-sectional view showing a state at the time of the first cutting and division after conveying in FIG. 18.
Figure 20:
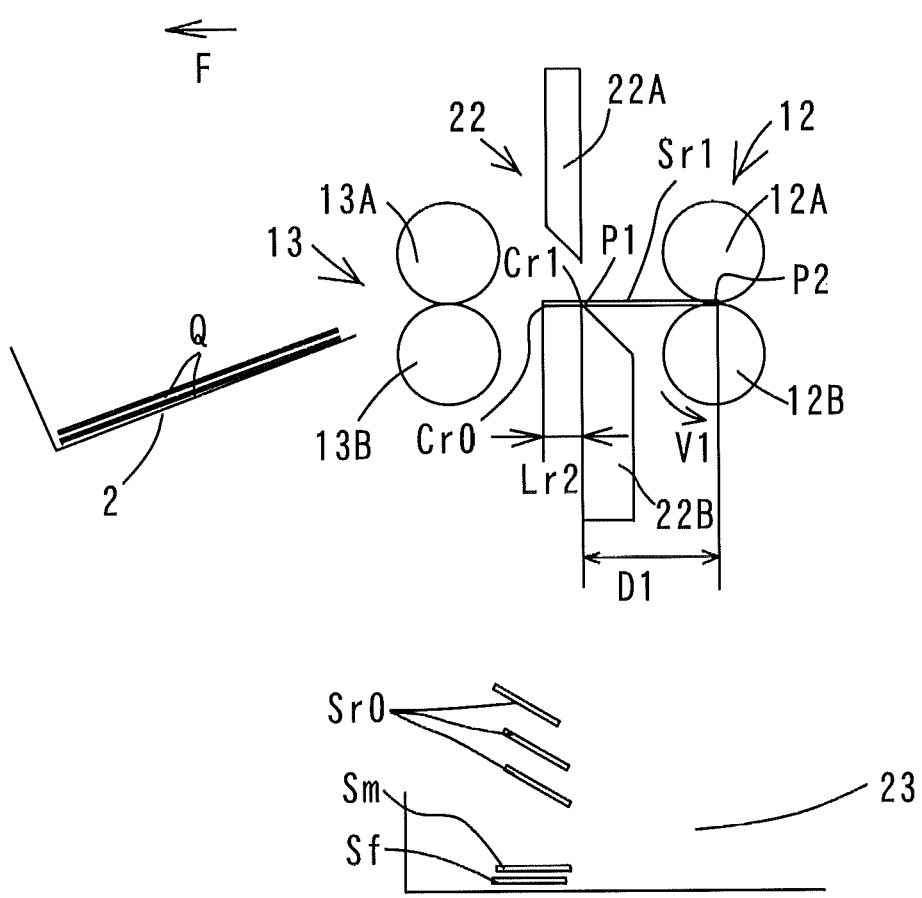
FIG. 20 is a schematic cross-sectional view showing a conveyed state to the last cutting and dividing position.
Figure 21:
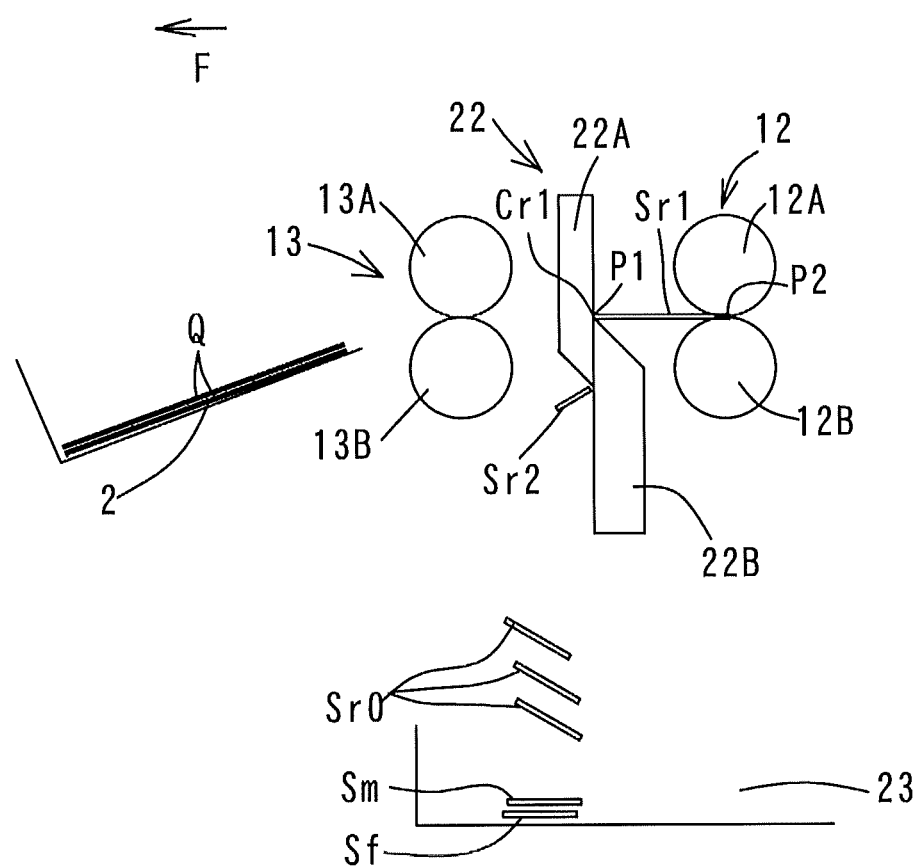
FIG. 21 is a schematic cross-sectional view showing a state where the rearmost end divided region is cut.
Figure 22:
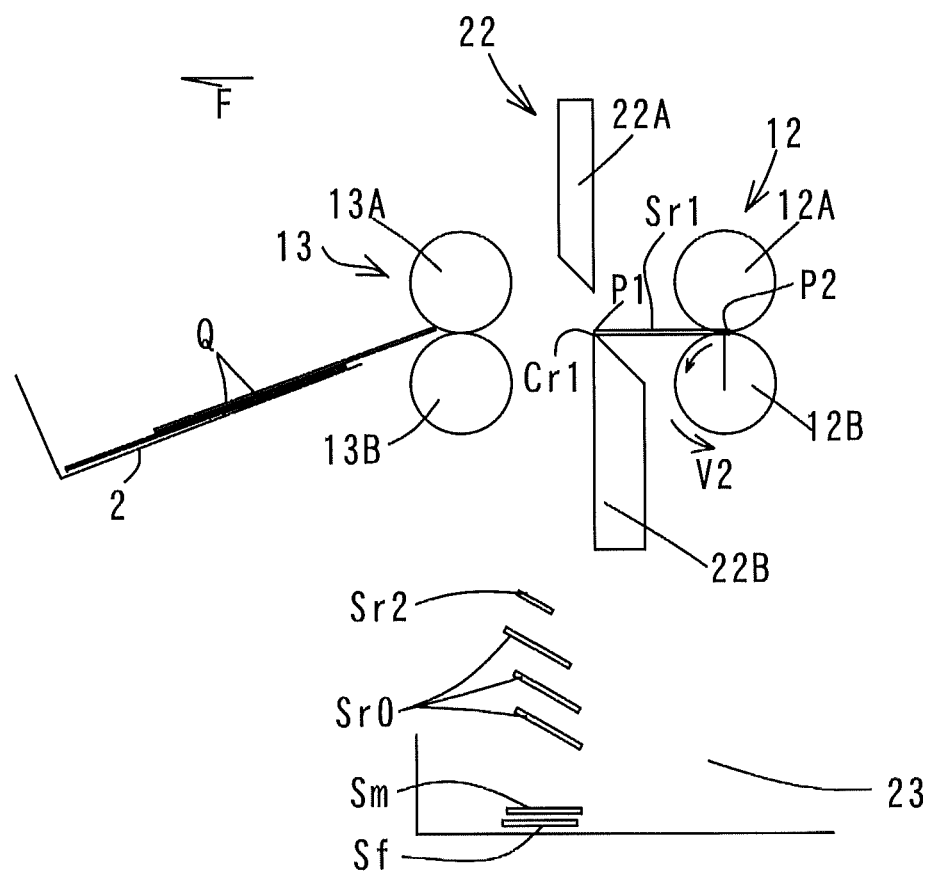
FIG. 22 is a schematic cross-sectional view showing a state where the cut strip in the rearmost end divided region after cutting is started to be guided downward by the rotation of a pair of conveying rollers on the upstream side.
Figure 23:
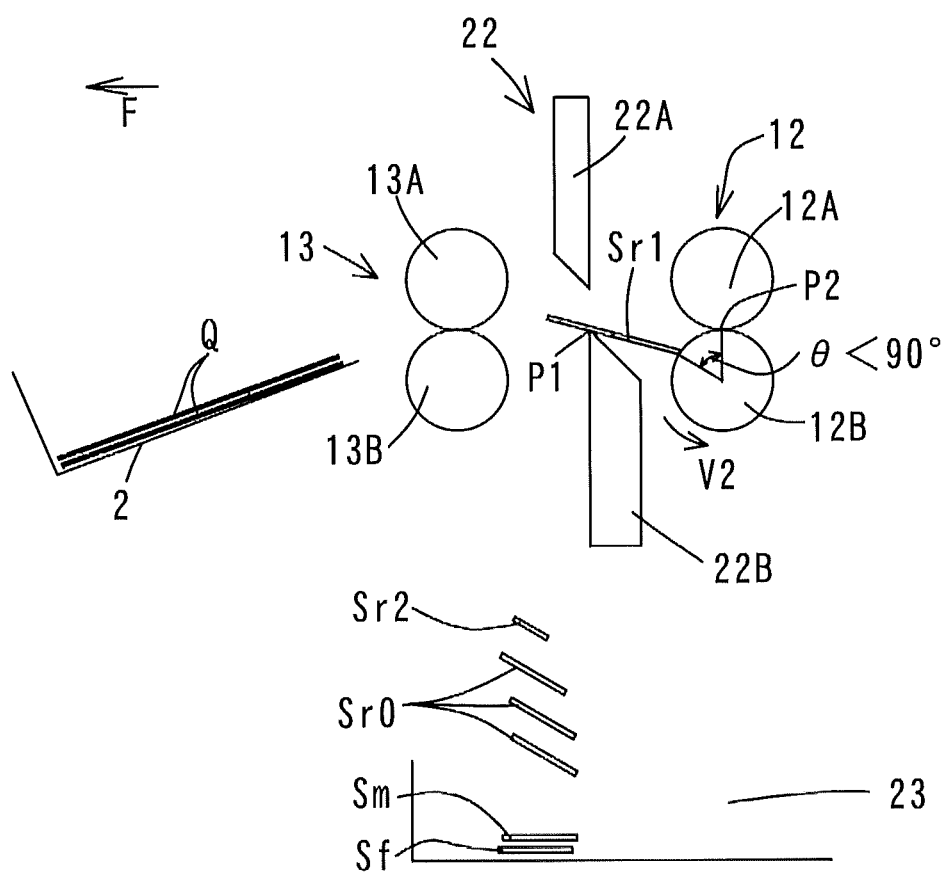
FIG. 23 is a schematic cross-sectional view showing a state where the cut strip in the rearmost end divided region is guided downward.
Figure 24:
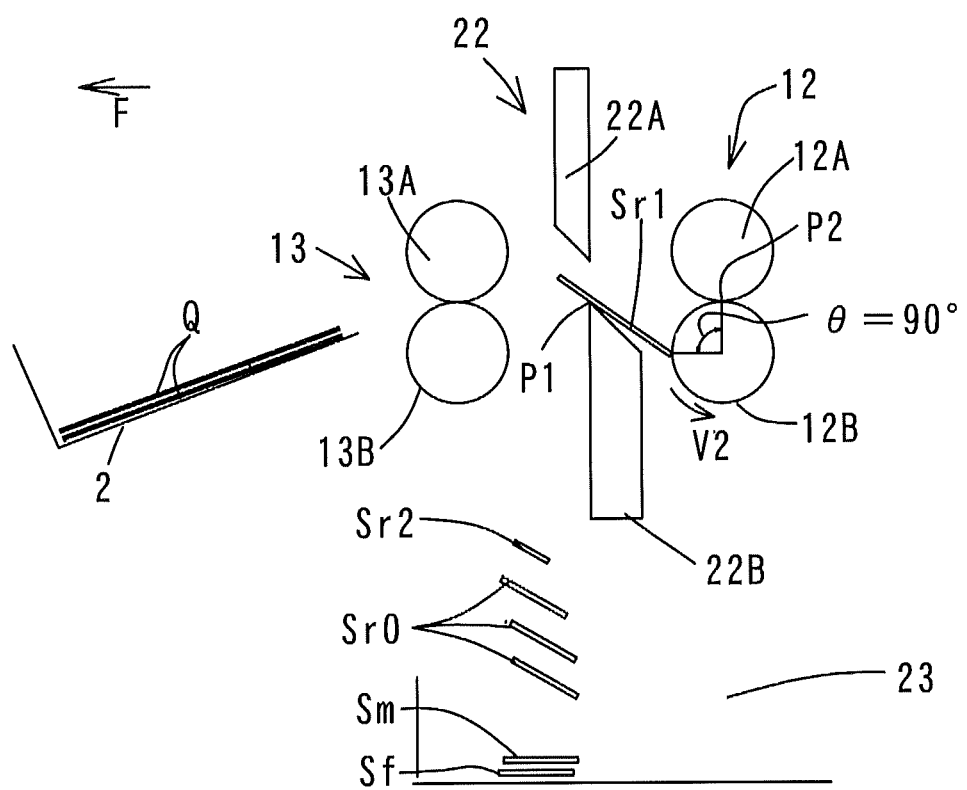
FIG. 24 is a schematic cross-sectional view showing a state where the pair of conveying rollers on the upstream side are rotated 90° from the state in FIG. 22.

(3) In a third step, the substantial operation control of the cutting mechanism 22 and the pair of first conveying rollers 12 is performed. That is, as shown in FIGS. 18 to 20, in the cutting operation for rear end cut region Sr on first cutting line Cr, three cutting lines Cr0 for division, and last cutting line Cr1, the pair of first conveying rollers 12 are controlled to be driven at normal conveying speed V1 (e.g., 600 mm/sec or more) at the rotation angle corresponding to length Lr0 (sheet conveying amount) of each cut strip. As shown in FIG. 21, cutting on last cutting line Cr1 is performed. As shown in FIGS. 22 to 24, rear edge (Nb) of rearmost end divided region Sr1 passes through nipping position P2 of the pair of first conveying rollers 12, and driving of the pair of first conveying rollers 12 is then controlled so that the pair of first conveying rollers 12 are rotated 90° or more ($\theta \geq 90°$). Conveying speed V2 of the pair of first conveying rollers 12 in FIGS. 22 to 24 is set to be a value more than normal conveying speed V1 (e.g., 700 mm/sec or more).

Figure 25:
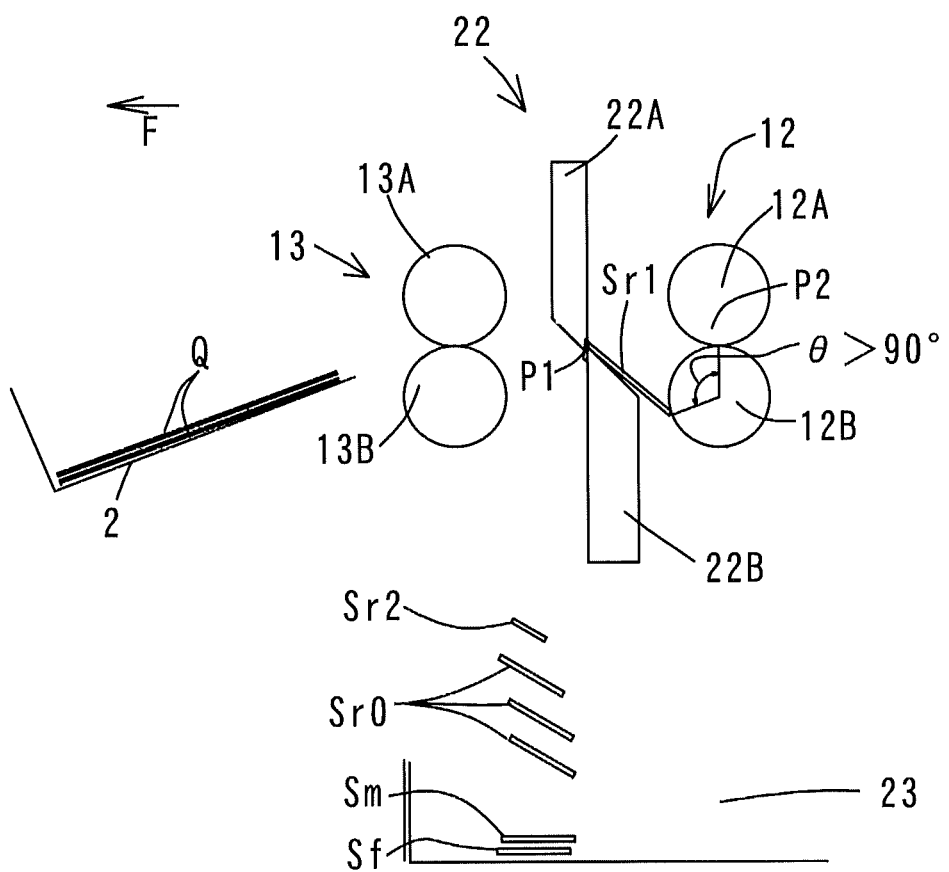
FIG. 25 is a schematic cross-sectional view showing a state where a re-cutting mechanism is operated after the pair of conveying rollers on the upstream side are rotated 90° from the state in FIG. 22.

(4) In a fourth step, as shown in FIG. 25, when the rear end of rearmost end divided region Sr1 passes through nipping position P2 of the pair of first conveying rollers 12 so that the pair of first conveying rollers 12 are rotated 90° or more, the cutting mechanism 22 performs the re-cutting operation.

[The Overview of the Entire Operation of the Sheet Processing Apparatus]

Since the inputting process of operation settings information about sheet size and type and the array, number, and size of products on the operational panel 46, the sheet feeding process of the sheet feeding section 3, the reading process of the CCD sensor 26, the cutting operation of the slit forming mechanism 20, the cutting operation of the cut strip dropping mechanism 27, and the fold forming operation of the fold forming mechanism 21 are the same as the embodiment of the first invention in FIG. 1, the description thereof is omitted, and the operation process of the cutting mechanism 22 will be described.

The pair of first conveying rollers 12 feed sheet N into the cutting mechanism 22 in FIG. 1 at normal conveying speed V1, and the cutting mechanisms 22 cuts sheet N on cutting lines C and Cr in FIG. 14. As shown in FIG. 18, the cut strips in front end cut region Sf and middle cut region Sm after cutting pass through between the cutting mechanism 22 and the pair of second conveying rollers 13 to be discharged downward into the strip discharging section 23. On the other hand, the cut strip in rear end cut region Sr is discharged by the following different method according to the value of sheet conveying direction length Lr.

In FIG. 18, sheet conveying direction length Lr of rear end cut region Sr is equal to or more than predetermined value Dn. As shown in FIGS. 18 to 20, rear end cut region Sr is cut into divided region Sr0 having predetermined fine-cutting unit length Lr0 sequentially from the sheet conveying direction downstream end thereof. Cut strip (Sr0) is discharged from between the cutting mechanism 22 and the pair of second conveying rollers 13 downward into the strip discharging section 23. In this case, the conveying speed of the pair of first conveying rollers 12 is normal conveying speed V1.

Figure 26:
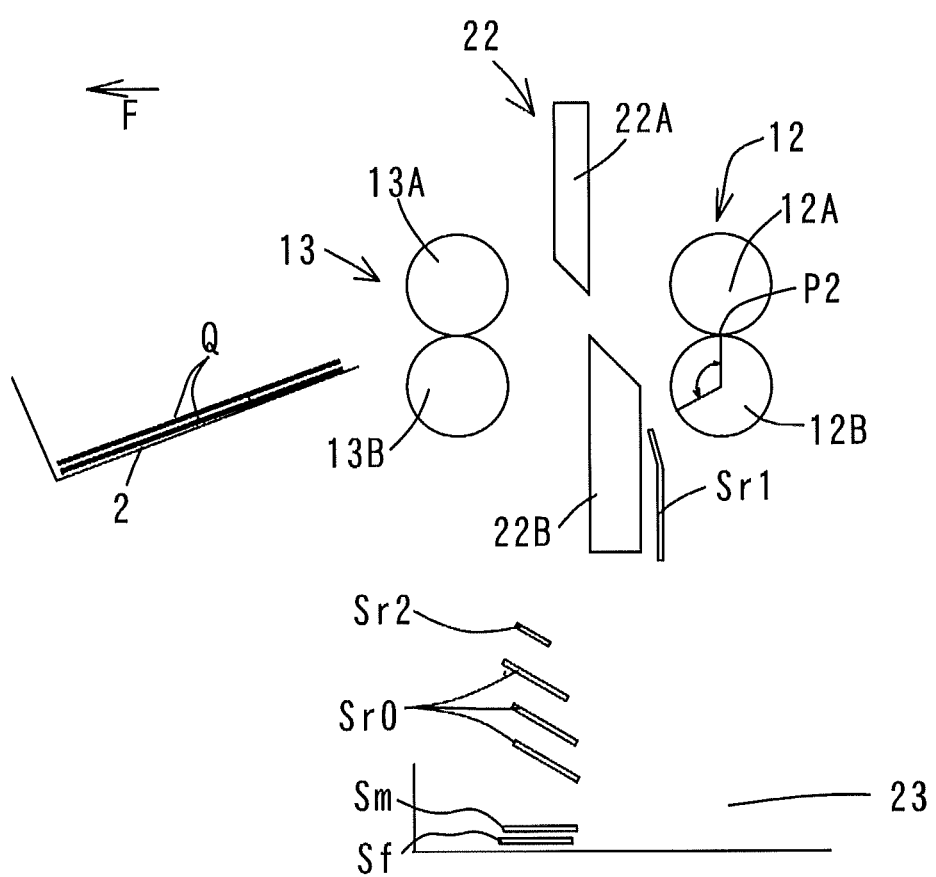
FIG. 26 is a schematic cross-sectional view showing a state where the cut strip in the rearmost end divided region is dropped.
Figure 27:
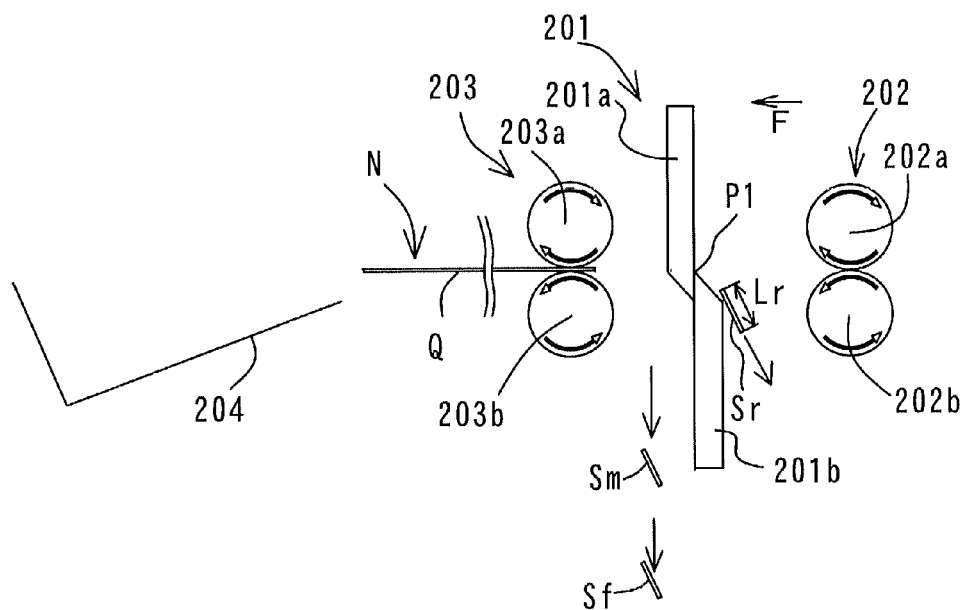
FIG. 27 is a schematic cross-sectional view showing an operation of a conventional cutting mechanism.
Figure 28:
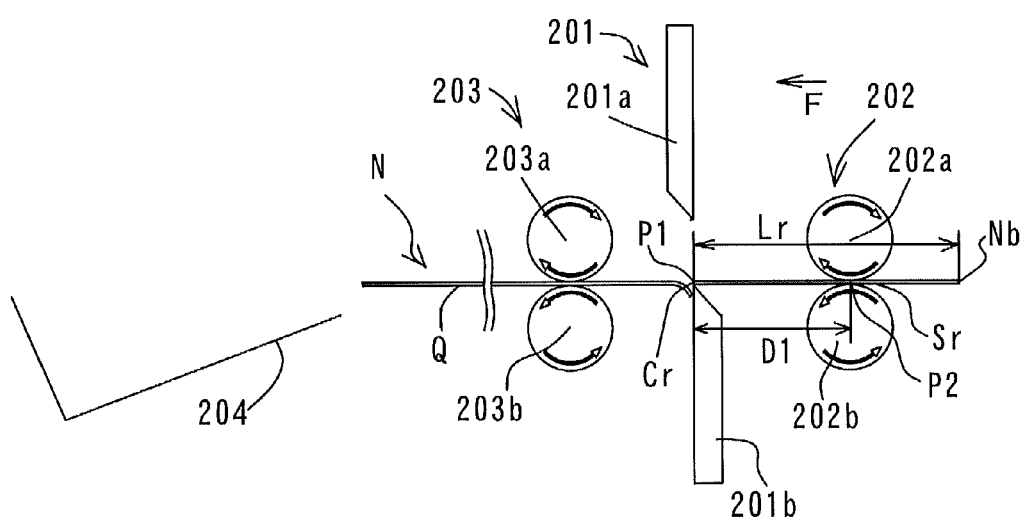
FIG. 28 is a schematic cross-sectional view showing another operation of the conventional cutting mechanism.
Figure 29:
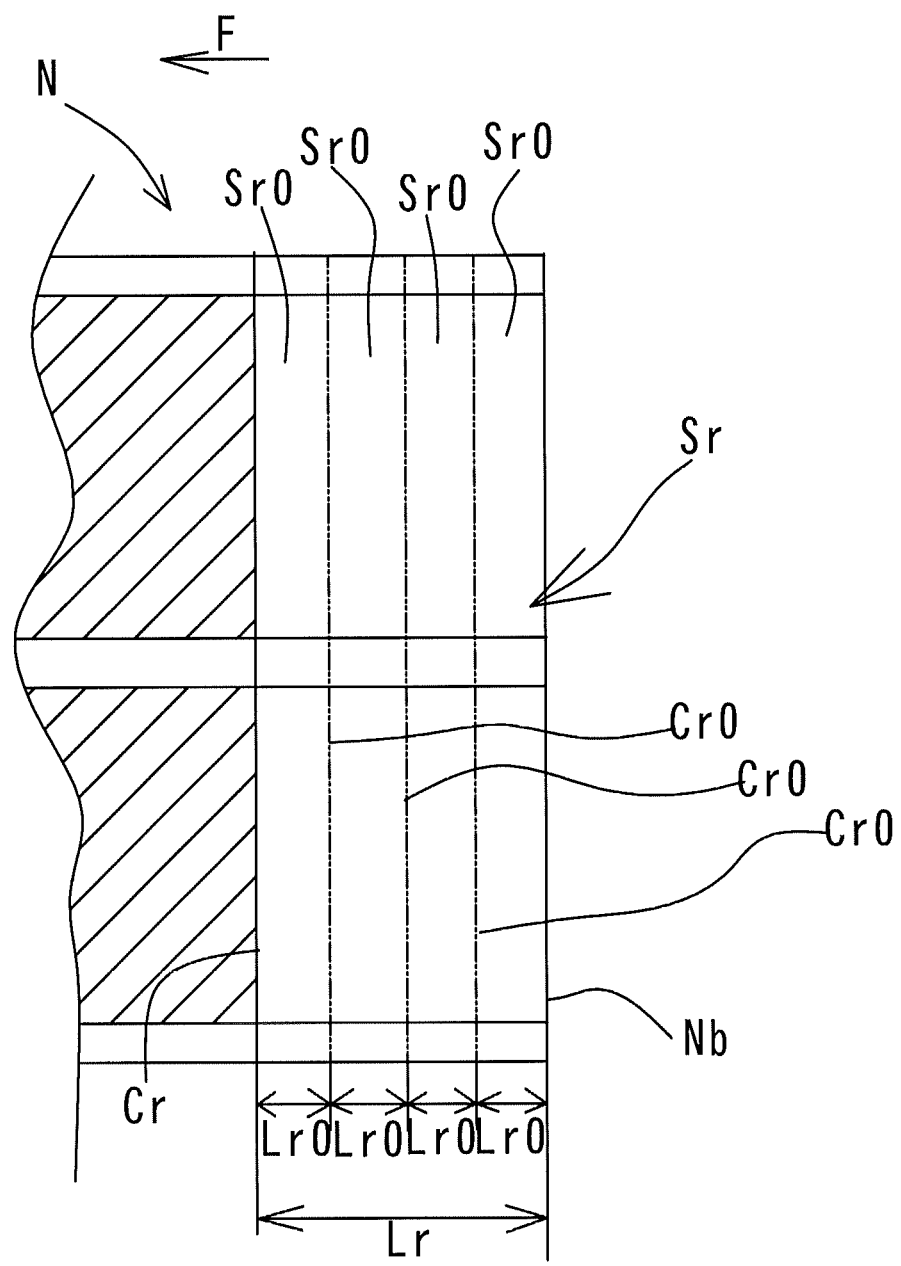
FIG. 29 is a plan view showing a conventional cutting pattern in a rear end cut region.
Figure 30:
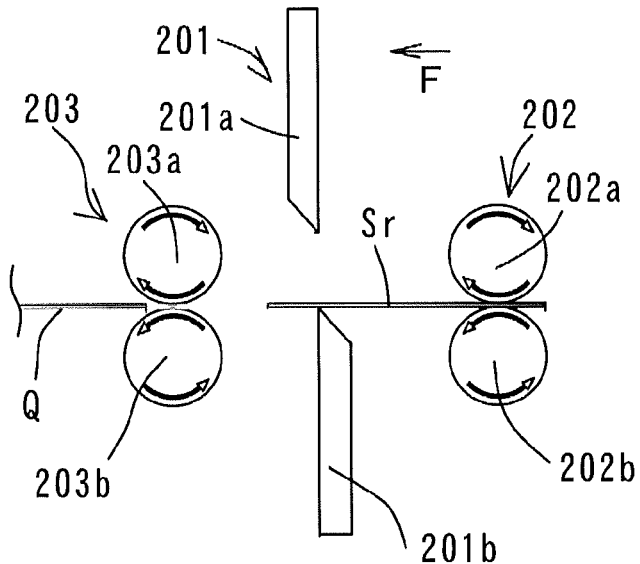
FIG. 30 is a schematic cross-sectional view showing an operation of the conventional cutting mechanism based on the cutting pattern in FIG. 29.
Figure 31:
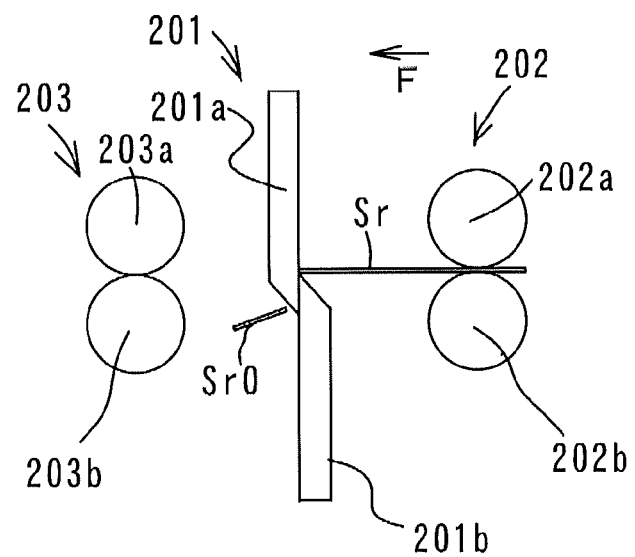
FIG. 31 is a schematic cross-sectional view showing the operation after FIG. 30
Figure 32:
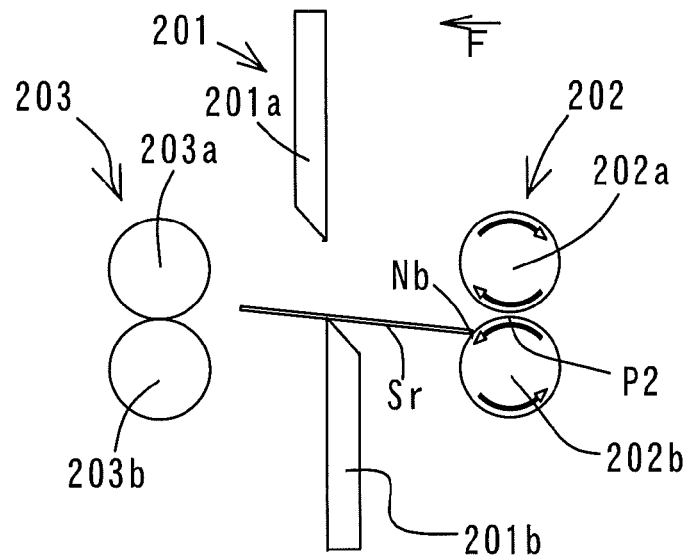
FIG. 32 is a schematic cross-sectional view showing the operation after FIG. 31.
Figure 33:
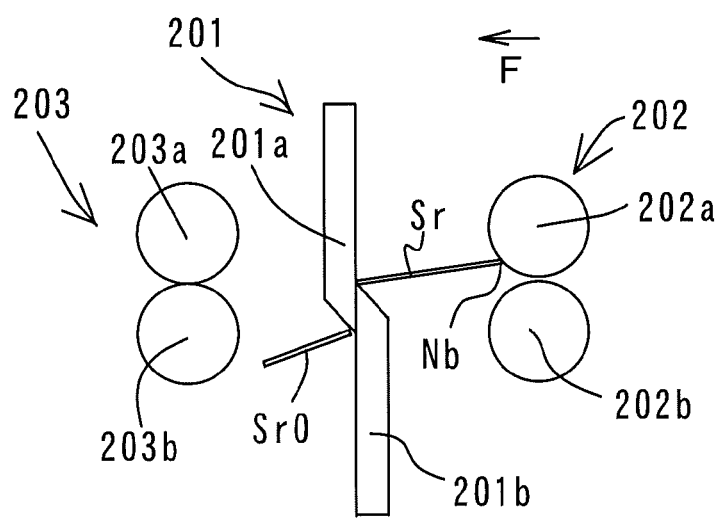
FIG. 33 is a schematic cross-sectional view showing the operation after FIG. 32.
Figure 34:
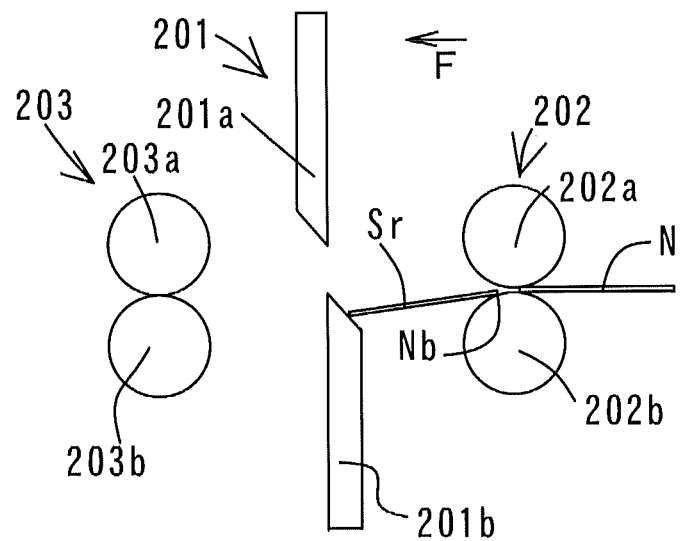
FIG. 34 is a schematic cross-sectional view showing the operation after FIG. 33.
Figure 35:
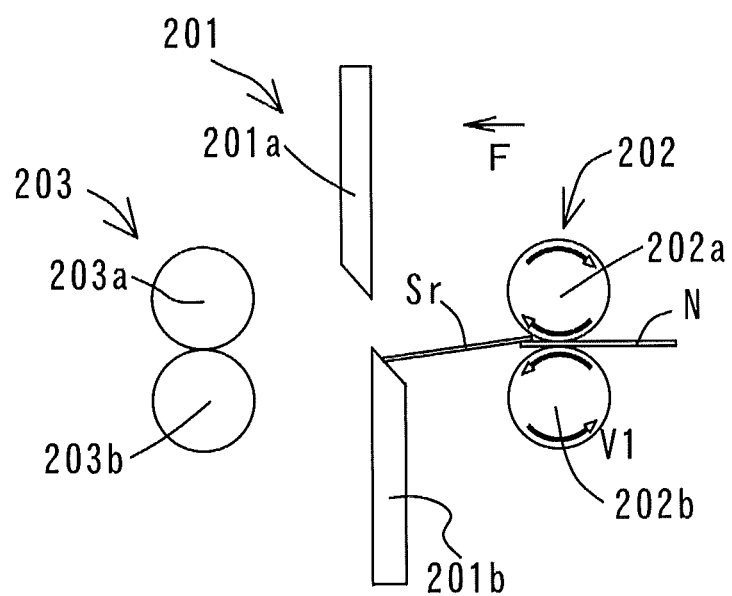
FIG. 35 is a schematic cross-sectional view showing the operation after FIG. 34.

As shown in FIG. 21, cutting on last cutting line Cr1 for division is performed. As shown in FIG. 22, the pair of first conveying rollers 12 are rotated at Conveying speed V2 higher than normal conveying speed V1. In this case, after rearmost end divided region Sr1 passes through nipping position P2 of the pair of first conveying rollers 12, the pair of first conveying rollers 12 are rotated 90° or more. With this, as shown in FIG. 23, while the front portion of the cut strip in rearmost end divided region Sr1 is supported by the lower fixed blade 22B, rear edge Nb is guided forward and downward (downward of the conveying direction downstream side) by the lower conveying roller 12B of the pair of first conveying rollers 12. Then, as shown in FIG. 12, when the pair of first conveying rollers 12 are rotated 90° ($\theta = 90°$), the cut strip is started to be dropped from the pair of first conveying rollers 12. As shown in FIG. 25, when the pair of first conveying rollers 12 are rotated 90° or more ($\theta > 90°$), the cutting mechanism 22 performs the re-cutting operation to give an impact to near the front end of the cut strip in rearmost end divided region Sr1. With this, as shown in FIG. 26, the cut strip in rearmost end divided region Sr1 passes through between the cutting mechanism 22 and the pair of first conveying rollers 12 to be immediately discharged downward into the strip discharging section 23. In the embodiment, at the time of the re-cutting operation shown in FIG. 25, the pair of first conveying rollers 12 are held rotated to continue conveying.

When sheet conveying direction length Lr of rear end cut region Sr shown in FIG. 14 is less than predetermined value Dn, the cutting and dividing operation is not performed.

The Effects of the Embodiment of the Second Invention (1) When rear end cut region Sr of sheet N is finely cut and divided into predetermined fine-cutting unit length Lr0, after the rear end of rearmost end divided region Sr1 passes through nipping position P2 of the pair of first conveying rollers 12, the pair of first conveying rollers 12 are rotated 90° or more. The rear end of the cut strip in rearmost end divided region Sr1 is guided forward and downward of the conveying roller 12B (downward of the conveying direction downstream side) along the surface of the lower conveying roller 12B of the pair of first conveying rollers 12 to be reliably discharged downward from gap (D4) between the cutting mechanism 22 and the pair of first conveying rollers 12. With this, sheet jamming, sheet damaging, and discharging of the cut strip into the sheet receiving section together with the product can be eliminated.

(2) Predetermined fine-cutting unit length Lr0 is set to be equal to or less than interval D3 in sheet conveying direction F between the cutting mechanism 22 and the pair of second conveying rollers 13. Therefore, the cut strip in divided region Sr0 which is divided into predetermined fine-cutting unit length Lr0 can be reliably discharged downward from between the cutting mechanism 22 and the pair of second conveying rollers 13 on the sheet conveying downstream side without being stayed.

(3) When the pair of first conveying rollers 12 are rotated 90° or more, the cutting mechanism 22 performs the re-cutting operation to give an impact to near the front end of the cut strip in rearmost end divided region Sr1. Therefore, the cut strip in rearmost end divided region Sr1 can be discharged downward into the strip discharging section 23 more reliably and immediately.

(4) Conveying speed V2 of rearmost end divided region Sr1 on the pair of first conveying rollers 12 is higher than normal conveying speed V1. Therefore, the efficiency of the discharging operation of the cut strip in rearmost end divided region Sr1 can be improved. The conveying speed of predetermined finely cut region Sr0 and cut region Sr2 prior to rearmost end divided region Sr1 is the same as the normal conveying speed. This can prevent lowering of the stopping position accuracy due to the increased rotational speed since the stopping position accuracy of the sheet is important to precisely cut divided regions Sr0 and Sr2 other than rearmost end divided region Sr1 into predetermined dimensions Lr0 and Lr2. On the other hand, even when the stopping position accuracy is lowered to slightly shift the cutting position by the re-cutting operation, rearmost end divided region Sr1 has the length of predetermined dimension Lr1 to be discharged downward from gap (D4) between the cutting mechanism 22 and the pair of first conveying rollers 12. Conveying speed V2 can thus be higher than normal conveying speed V1. Further, at the time of the cutting operation, the pair of first conveying rollers 12 are held rotated. Therefore, the operation of re-cutting the cut strip in rearmost end divided region Sr1 to discharge the cut strip in rearmost end divided region Sr1 downward into the strip discharging section 23 can be performed continuously and immediately.

Other Embodiments (1) The sheet processing apparatus of the embodiments includes the cutting mechanism 22 which cuts the sheet in sheet conveying width direction W orthogonal to sheet conveying direction F, the slit forming mechanism 20 which forms a slit in parallel with sheet conveying direction F, and a fold forming mechanism 21 which forms a fold in sheet conveying width direction W. However, needless to say, the present invention is applicable to a sheet processing apparatus including only a cutting mechanism, a sheet processing apparatus which combines a cutting mechanism with other processing mechanisms (a perforation forming mechanism, and a rounding mechanism), as needed, and a sheet processing apparatus which has a different number of processing mechanisms and a different number of pairs of conveying rollers from the embodiments.

(2) The cutting mechanism of the embodiments includes the upper movable blade and the lower fixed blade. The cutting mechanism according to the present invention is not limited to the configuration, and may include a lower movable blade and an upper fixed blade. That is, the cutting mechanism may include at least a pair of cutting blades on the opposite sides of a conveying surface, and cut a sheet on the conveying surface in the direction orthogonal to the conveying direction.

(3) In the embodiment of the second invention, after the rear end of rearmost end divided region Sr1 passes through nipping position P2 of the pair of first conveying rollers 12, when the pair of first conveying rollers 12 are rotated 90° or more, the cutting mechanism 22 performs the re-cutting operation, and at the time of the re-cutting operation, the rotation of the pair of first conveying rollers 12 is controlled to be held. However, in the second example of the present invention, at the time of the re-cutting operation, the rotation of the pair of first conveying rollers 12 may be stopped to hold sheet conveying stopped. In this case, the re-cutting operation is performed in a state where sheet conveying is stopped, so that an impact can be reliably given to near the front end of the cut strip of rearmost end divided region Sr1. Further, after the re-cutting operation, sheet conveying of the pair of first conveying rollers 12 may be restarted. In this case, the pair of first conveying rollers 12 are operated to discharge downward the cut strip in rearmost end divided region Sr1 onto which the impact is given, so that the cut strip can be discharged downward into the strip discharging section 23 more immediately. In addition, the re-cutting operation is not required to be performed. In this case, the rear end of the cut strip in rearmost end divided region Sr1 is guided forward and downward (downward of the conveying direction downstream side) of the lower conveying roller 12B of the pair of first conveying rollers 12. Therefore, the cut strip in rearmost end divided region Sr1 can be immediately discharged downward from gap (D4) between the cutting mechanism 22 and the pair of first conveying rollers 12.

(4) In the embodiment of the second invention, predetermined value Dn which determines whether or not the cutting and dividing operation is performed is set to be substantially the same value as distance D1 between cutting position P1 and nipping position P2 of the pair of first conveying rollers 12 on the conveying upstream side. However, in FIG. 3, predetermined value Dn can be set in the range of $D1 \leq Dn < (D1+Lr0)$.

(5) In the embodiment of the second invention, in conveying of rearmost end divided region Sr1, the conveying speed of the pair of first conveying rollers 12 which are rotated 90° or more can be lower than the normal conveying speed or the same as the normal conveying speed according to sheet quality and thickness. For instance, the conveying speed of the pair of first conveying rollers 12 is preferably lower than the normal conveying speed so that a thin sheet whose surface is likely to be slipped cannot be slipped and can be reliably guided downward of the conveying rollers.

DESCRIPTION OF REFERENCE SIGNS

1: Apparatus body
2: Sheet receiving section
3: Sheet feeding section
5: Conveying path
12: A pair of first conveying rollers
12A: Upper conveying roller
12B: Lower conveying roller
13: A pair of second conveying rollers
22: Cutting mechanism
22A: Upper movable blade
22B: Lower fixed blade
43: Roller driving source
50: Cutting driving source
N: Sheet
Q: Product (Result)
Sr: Rear end cut region
Sr0: Divided region cut into a predetermined fine-cutting unit length
Sr1: Rearmost end divided region
C, Cr: Cutting line in a direction orthogonal to a sheet conveying direction
Cr0, Cr1: Cutting line for division in a direction orthogonal to a sheet conveying direction
Lr: Sheet conveying direction length of a rear end cut region
Lr1: Sheet conveying direction length of a rearmost end divided region
Lr0: Predetermined fine-cutting unit length
D1: Minimum reference length
D2: Maximum reference length
Dn: Predetermined value

The invention claimed is:

1. A method for controlling a sheet processing apparatus including a cutting mechanism which cuts a sheet in a direction orthogonal to a sheet conveying direction by upper and lower cutting blades on the opposite sides of a sheet conveying surface, a pair of first conveying rollers which are arranged on the sheet conveying upstream side of the cutting mechanism and feed the sheet to the cutting mechanism, a pair of second conveying rollers which are arranged on the sheet conveying downstream side of the cutting mechanism, driving sources which independently drive the pair of first conveying rollers, the pair of second conveying rollers, and the cutting mechanism, and a control section which controls the operation of the driving sources, in which when sheet conveying direction length of rear end cut region of the sheet is equal to or more than predetermined value, rear end cut region is sequentially cut and divided into predetermined fine-cutting unit length from the sheet conveying downstream end thereof, wherein when sheet conveying direction length of rearmost end divided region in rear end cut region is equal to or more than minimum reference length corresponding to the distance between cutting position of the cutting mechanism and nipping position of the pair of first conveying rollers and is less than maximum reference length in which predetermined fine-cutting unit length is added to minimum reference length, the control section controls the driving source to hold the upper and lower blades of the cutting mechanism opened immediately after the downstream edge of rearmost end divided region is cut and to drive the pair of first conveying rollers at a limited conveying speed lower than a normal conveying speed.

2. The method according to claim 1, wherein the lower conveying roller of the pair of first conveying rollers is driven by the driving sources.

3. The method according to claim 1, wherein predetermined fine-cutting unit length is set to be equal to or less than interval in the sheet conveying direction between the cutting mechanism and the pair of second conveying rollers.

4. The method according to claim 1, wherein the normal conveying speed is equal to or more than approximately 600 mm/sec, and the limited conveying speed is equal to or less than approximately 500 mm/sec.

5. A method for controlling a sheet processing apparatus including a cutting mechanism which cuts a sheet in a direction orthogonal to a sheet conveying direction by upper and lower cutting blades on the opposite sides of a sheet conveying surface, a pair of first conveying rollers which are arranged on the sheet conveying upstream side of the cutting mechanism and feed the sheet to the cutting mechanism, a pair of second conveying rollers which are arranged on the sheet conveying downstream side of the cutting mechanism, driving sources which independently drive the pair of first conveying rollers, the pair of second conveying rollers, and the cutting mechanism, and a control section which controls the operation of the driving source, in which when sheet conveying direction length of rear end cut region of the sheet is equal to or more than predetermined value, rear end cut region is sequentially cut and divided into predetermined fine-cutting unit length from the sheet conveying downstream end thereof, wherein the control section controls the driving sources so that sheet conveying direction length of rearmost end divided region in rear end cut region is the length substantially corresponding to distance between cutting position of the cutting mechanism and nipping position of the pair of first conveying rollers and that when rearmost end divided region passes through the nipping position of the pair of first conveying rollers, the pair of first conveying rollers are rotated 90° or more.

6. The method according to claim 5, wherein after the pair of first conveying rollers are rotated 90° or more, the cutting mechanism is controlled to perform a re-cutting operation with respect to rearmost end divided region.

7. The method according to claim 6, wherein the pair of first conveying rollers are stopped at the time of the re-cutting operation of the cutting mechanism.

8. The method according to claim 7, wherein the pair of first conveying rollers are controlled to restart rotation after the re-cutting operation of the cutting mechanism.

\* \* \* \* \*